(12) United States Patent
Wang et al.

(10) Patent No.: US 11,392,099 B2
(45) Date of Patent: Jul. 19, 2022

(54) DATA-DRIVEN NONLINEAR OUTPUT-FEEDBACK CONTROL OF POWER GENERATORS

(71) Applicant: Mitsubishi Electric Research Laboratories, Inc., Cambridge, MA (US)

(72) Inventors: Yebin Wang, Acton, MA (US); Weinan Gao, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 672 days.

(21) Appl. No.: 16/362,795

(22) Filed: Mar. 25, 2019

(65) Prior Publication Data

US 2020/0310372 A1 Oct. 1, 2020

(51) Int. Cl.
*G05B 19/042* (2006.01)
*H02P 9/02* (2006.01)
*H02P 9/00* (2006.01)

(52) U.S. Cl.
CPC ............ *G05B 19/042* (2013.01); *H02P 9/009* (2013.01); *H02P 9/02* (2013.01); *G05B 2219/2639* (2013.01)

(58) Field of Classification Search
CPC . G05B 19/042; G05B 2219/2639; H02P 9/02; H02P 9/00; H02P 21/0014; H02P 23/0018
See application file for complete search history.

(56) References Cited

U.S. PATENT DOCUMENTS

| | | | | |
|---|---|---|---|---|
| 7,122,916 B2 * | 10/2006 | Nguyen | ............... | F01D 13/00 307/57 |
| 2016/0281607 A1 * | 9/2016 | Asati | ............... | F01K 13/00 |
| 2016/0282821 A1 * | 9/2016 | Chen | ............... | G06F 17/18 |
| 2019/0384237 A1 * | 12/2019 | Wang | ............... | G05B 13/0265 |

* cited by examiner

*Primary Examiner* — Thomas C Lee
*Assistant Examiner* — Syed A Warsi
(74) *Attorney, Agent, or Firm* — Gennadiy Vinokur; Hironori Tsukamoto

(57) ABSTRACT

A control system for controlling a power generator of a power generation system executes a control policy to map an input-and-output sequence to a current value of the excitation voltage, submits the current value of the excitation voltage to the power generator, accepts a current value of the rotor angle caused by actuating the power generator according to the current value of the excitation voltage, and updates the input-and-output sequence with the corresponding current values of the rotor angle and the excitation voltage. The input-and-output sequence of values of the operation of the power generator includes a sequence of multiple values of the rotor angle of the power generator and a corresponding sequence of multiple values of excitation voltage to the power generator causing the values of the rotor angle. The control policy maps the input-and-output sequence to a current control input defining the current value of the excitation voltage.

14 Claims, 18 Drawing Sheets

DATA-DRIVEN NONLINEAR OUTPUT-FEEDBACK CONTROL OF POWER GENERATORS

TECHNICAL FIELD

The present disclosure relates generally to controlling of electric power systems, and more particularly to data-driven nonlinear control of power generators.

BACKGROUND

Electric power generation systems have multiple power generators that operate in synchronism under a normal operation. That is, frequency, phase, and amplitude of voltages at the terminals of a generator hold a fixed relationship with the same parameters of the remaining generators in the power system. Before a generator can be connected to an electric power system, the frequency, phase, and amplitude of the voltages at its bus need to be matched with those of the power system at the point of interconnection. Once, the so called synchronization parameters are matched within a desired tolerance, the generator breaker is closed. Any mismatch in the synchronization parameters during connection of a generation unit by a generator breaker may result in undesired transients and disruption of the system.

The concept of microgrid, in which several small distributed generation units operate together to form a small power system, is finding increasing acceptance as a solution to increase the share of renewable energy resources. A microgrid may be operated in either of the following two modes: grid-connected mode and islanded mode. In grid-connected model, entire microgrid constituting several distributed generation units operate as a single generator from the perspective of the main grid. Hence, synchronization of a microgrid with the main grid is further challenging as the synchronization parameters of the microgrid at the point of interconnection with the main grid depends on several generation units. Synchronization process may also require communication among the distributed generation units in the microgrid.

U.S. Pat. No. 7,122,916 B2 discloses a multi-unit power generation system comprising a plurality of synchronous generators connected in parallel, a switching system for switching between and/or aggregating a generator load produced by the plurality of generators and a utility grid load, and a control system. The control system is in communication with each generator for communicating command signals to each generator. The control system is further in communication with the switching system for commanding the switching system to switch between or aggregate the generator load and the utility grid load. Each generator may include, for example, a micro-turbine generator. When two or more synchronous generators are interconnected, their stator voltages and currents of all the machines must have the same frequency and the rotor speed of each of the synchronous generators should be synchronized to this frequency. That is: the rotors of all interconnected synchronous generators must be in synchronism, because lack of sufficient synchronization results in system instability oscillation in rotor angles.

There is a need to optimize operation of power systems to synchronize at least two synchronous generators according to different specific tasks. Example of these power systems can be islanded modernized micro-grids using engine-generators, which have been applied in university campuses and hospitals, and a smart grid that includes distributed loads and multi-generators. In another example, perturbation to any generator results in acceleration or deceleration of the rotors of all generators, and thus loss of synchronism. It is desirable to exert optimal control to optimally shape the transients of the generators back to the synchronism status.

Existing work realize the optimal control of power generators for different specific tasks. However, the optimal control design (design of optimal controller) is usually dependent on the accurate knowledge of system model and parameters. Taking the load frequency control of multiple generators as an instance, some model-based optimal control design needs to know the system model accurately, i.e. the dynamics of mechanical power, rotor angle, relative rotor angle, and electrical power, and the value of parameters including damping constant, inertia constant, and the governor time constant. However, during or before the operation of such systems, it is difficult or impractical to determine accurately the parameters of power generators.

Hence, some existing works aim to develop model-free optimal controllers for power generators. Model-free controllers are designed without accurate knowledge of the model. Based on the real-time measurement of the entire state of generators including the rotor angle, relative rotor speed, the mechanical power, an optimal controller for power generators can be iteratively learned and/or approximated. Comparing with the model-based control, the model-free power generators controller design relies on the online real-time state information, instead of the exact model of power generators. However, they depend on the measurement of all states of generators. For a large-scale power system, multitude of expensive sensors is needed to measure all of this information timely and accurately, which increase the operational cost of power systems.

SUMMARY

It is an object of some embodiments to provide a system and a method for controlling one or multiple power generators of a power generation system. It is another object of some embodiments to provide such a system and a method suitable for control of different configurations of the power generation system without relying on an accurate model of power generators and/or a model of a power generation system. It is another object of some embodiments to provide such a system and a method that can generate optimal control inputs to a power generator without the need to determine full state of the power generator and/or without the need to determine full state of a power generation system. State is a smallest set of variables in state-space representation of the controlled system that can represent the entire status (information) of the system at any given time. As used herein, the state of a power generator includes values of a rotor angle, a relative rotor speed, and a mechanical power of the power generator at different instances of time. Additionally or alternatively, it is another object of some embodiments to provide a stable and/or optimal data-driven control of a power generator by only measuring values of the rotor angles of the power generators.

Some embodiments are based on recognition that it is possible to learn a data-driven control policy when the entire state of the controlled system is known. This approach is referred as a state-feedback control. However, it is challenging to obtain (measure or infer) the entire state of the power generator including a rotor angle, a relative rotor speed, and a mechanical power in real time, without a good knowledge of the model of the power generator. Some embodiments are based on recognition that it is possible to construct a control policy to track some outputs of the power generator. However, there is no guarantee that such a tracking control policy is optimal and/or provides a stable control of the power generation system. For example, there is no guarantee that the tracking closed-loop power system can maintain stability in a small region. When the power system is subject to a large perturbation, typically caused by a natural disaster, such non-provable tracking control may not be able stabilize the power system, due to the lack of stability guarantee.

Some embodiments are based on realization, that if the controlled system is uniformly observable, it is possible to learn the control policy directly from a sequence of multiple values of inputs and outputs of controlled system without determining the state of the controlled system. That is control policy is not parameterized as a function of system state, but is parameterized as a function of a sequence of control inputs and system outputs. Some embodiments are based on realization, that in this context, to have uniformly observable system of inputs and outputs it is sufficient that the inputs and outputs have injective mapping to a state of the system, i.e., there is one-to-one mapping of the state of the system to the inputs/outputs of the system, but there may not exist an one-to-one mapping of the inputs/outputs to the state.

Some embodiments are based on realization that there is an injective mapping between some inputs and outputs of the power generator to its state. Specifically, there is an injective mapping between the state of the power generator with values of excitation voltage that controls an actuation of the power generator, and values of a rotor angle caused by the operation of the power generator according to the excitation voltage. In such a manner, some embodiments are based on realization that is possible to learn a control policy from input-and-output sequence of values of the operation of the power generator including a sequence of multiple values of the rotor angle of the power generator and a corresponding sequence of multiple values of excitation voltage to the power generator causing the values of the rotor angle. In effect, this realization allows to design an optimal and stable control policy for controlling a power generator without a need to have an accurate model of the power generator and without a need to determine mechanical and electrical power of a power generator.

Accordingly, one embodiment discloses a control system for controlling an operation of a power generator of a power generation system. The control system includes a receiver configured to accept a measurement of a current value of an angle of a rotor of the power generator and a transmitter configured to submit the current value of the excitation voltage to an actuator of the power generator. The receiver and the transmitter establish communication between the control system and the power generator over a control and/or communication channel. The channel can be wired or wireless. The receiver receives the current value of the rotor angle at each instance of time. In such a manner, the control system can accumulate a sequence of values of rotor angles for different instances of time. Similarly, the transmitter transmits a current value of the excitation voltage to an actuator of the power generator at each instance of time. However, the control system can accumulate a sequence of values of excitation voltage for different instances of time.

To that end, the control system includes a memory configured to store an input-and-output sequence of values of the operation of the power generator including a sequence of multiple values of the rotor angle of the power generator and a corresponding sequence of multiple values of excitation voltage to the power generator causing the values of the rotor angle. The memory is also configured to store a control policy mapping the input-and-output sequence to a current control input defining a current value of the excitation voltage. The control policy can be determined offline from the operational data of a power generator. Additionally or alternatively, the control policy can be determined and/or updated online during the operation of the power generation system.

Because the control policy is determined from and for the input-and-output sequence of pairs of values of the excitation voltage and the rotor angle, the control policy is data-driven. Because this control policy does not require the knowledge of full state and uses only inputs and outputs of the power generator, this control policy is referred herein as output-feedback control policy. In addition, some embodiments are based on observations, experimentation and mathematical proof that due to injective mapping between the input-and-output sequence of pairs of values of the excitation voltage and the rotor angle, the control policy is stable and iteratively approaches the optimal control policy.

To that end, the control system includes a processor configured to iteratively control the power generator using the control policy. For an iteration, the processor is configured to execute the control policy to map the input-and-output sequence to the current value of the excitation voltage, submit through the transmitter the current value of the excitation voltage to the actuator of the power generator, accept through the receiver the current value of the rotor angle caused by actuating the power generator according to the current value of the excitation voltage, and update the input-and-output sequence with the corresponding current values of the rotor angle and the excitation voltage. In effect, the control policy is a function of the input-and-output sequence of excitation voltages and rotor angles that allows avoiding determining mechanical and electrical power of the power generator. The update of the input-and-output sequence with the corresponding current values of the rotor angle and the excitation voltage allows to maintain the most relevant control data. For example, in some implementations, the processor, to update the input-and-output sequence, is configured to append the current values of the rotor angle and the excitation voltage to the end of the input-and-output sequence and remove the oldest pair of values of the rotor angle and the excitation voltage from the input-and-output sequence.

Some embodiments are based on understanding that there is a need to reduce a length of the input-and-output sequence to reduce the computational burden of learning and updating the control policy. Some embodiments are based on experimentation and mathematical proof that, to provide stable control, the lengths of the input-and-output sequence should be greater than one but does not have to be greater than the order of the system. In the context of power generation system, the order of the system is four, i.e., can be described by four differential equations. To that end, in some embodiments, the input-and-output sequence includes four values of the rotor angle and four values of the excitation voltage. In effect, this embodiment allows reducing computational complexity without sacrificing the guarantees of the control.

In some embodiments, the control policy is trained to control the rotor angle according to a reference trajectory. To that end, the control policy accepts as an input the reference trajectory. Additionally or alternatively, the reference trajectory can be a constant reference rotor angle, where the reference rotor angle may come from an upper-level coordination controller. In one embodiment, the value of the constant reference rotor angle is known in advance, and the control policy is trained for that value. Take an ith generator as an example. Define $\delta_i$ as its angle, and $\delta^*_i$ as its reference. Then, the angle error is defined by $\Delta\delta_i:=\delta_i-\delta^*_i$. The reference $\delta^*_i$ could be provided by a coordination controller according to load balancing. Here, we hope the angle errors of all the generators asymptotically converge to 0 eventually, $$\text{i.e., } \lim_{t\to\infty} \Delta\delta_i(t) = 0,$$

for i=1, 2, 3, ; ; ; .

Additionally or alternatively, the power generation system can include multiple generators, and the control policy is trained to drive asymptotically a relative angle between generators to a zero value. For example, before connecting some generators to power grid, the generator should be synchronized with the grid first. Since there is not power flow between the grid and these generators, the angles of these generators should be exactly the same to a specified value. In some implementations, the specified value is obtained from the coordination controller.

Accordingly, one embodiment discloses a control system for controlling an operation of a power generator of a power generation system, that includes a receiver configured to accept a measurement of a current value of an angle of a rotor of the power generator; a memory configured to store an input-and-output sequence of values of the operation of the power generator including a sequence of multiple values of the rotor angle of the power generator and a corresponding sequence of multiple values of excitation voltage to the power generator causing the values of the rotor angle; and a control policy mapping the input-and-output sequence to a current control input defining a current value of the excitation voltage; a transmitter configured to submit the current value of the excitation voltage for an actuator of the power generator; and a processor configured to iteratively control the power generator using the control policy, wherein for an iteration, the processor is configured to execute the control policy to map the input-and-output sequence to the current value of the excitation voltage; submit through the output interface the current value of the excitation voltage to the power generator; accept through the input interface the current value of the rotor angle caused by actuating the power generator according to the current value of the excitation voltage; and update the input-and-output sequence with the corresponding current values of the rotor angle and the excitation voltage.

Another embodiment discloses a control method for controlling an operation of a power generator of a power generation system, wherein the method uses a processor coupled with stored instructions implementing the method, wherein the instructions, when executed by the processor carry out steps of the method, that includes executing a control policy to map an input-and-output sequence to a current value of the excitation voltage, wherein the input-and-output sequence of values of the operation of the power generator includes a sequence of multiple values of the rotor angle of the power generator and a corresponding sequence of multiple values of excitation voltage to the power generator causing the values of the rotor angle, and wherein the control policy maps the input-and-output sequence to a current control input defining the current value of the excitation voltage; submitting the current value of the excitation voltage to the power generator; accepting a current value of the rotor angle caused by actuating the power generator according to the current value of the excitation voltage; and updating the input-and-output sequence with the corresponding current values of the rotor angle and the excitation voltage.

Yet another embodiment discloses a non-transitory computer readable storage medium embodied thereon a program executable by a processor for performing a method. The method includes executing a control policy to map an input-and-output sequence to a current value of the excitation voltage, wherein the input-and-output sequence of values of the operation of the power generator includes a sequence of multiple values of the rotor angle of the power generator and a corresponding sequence of multiple values of excitation voltage to the power generator causing the values of the rotor angle, and wherein the control policy maps the input-and-output sequence to a current control input defining the current value of the excitation voltage; submitting the current value of the excitation voltage to the power generator; accepting a current value of the rotor angle caused by actuating the power generator according to the current value of the excitation voltage; and updating the input-and-output sequence with the corresponding current values of the rotor angle and the excitation voltage.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1A:
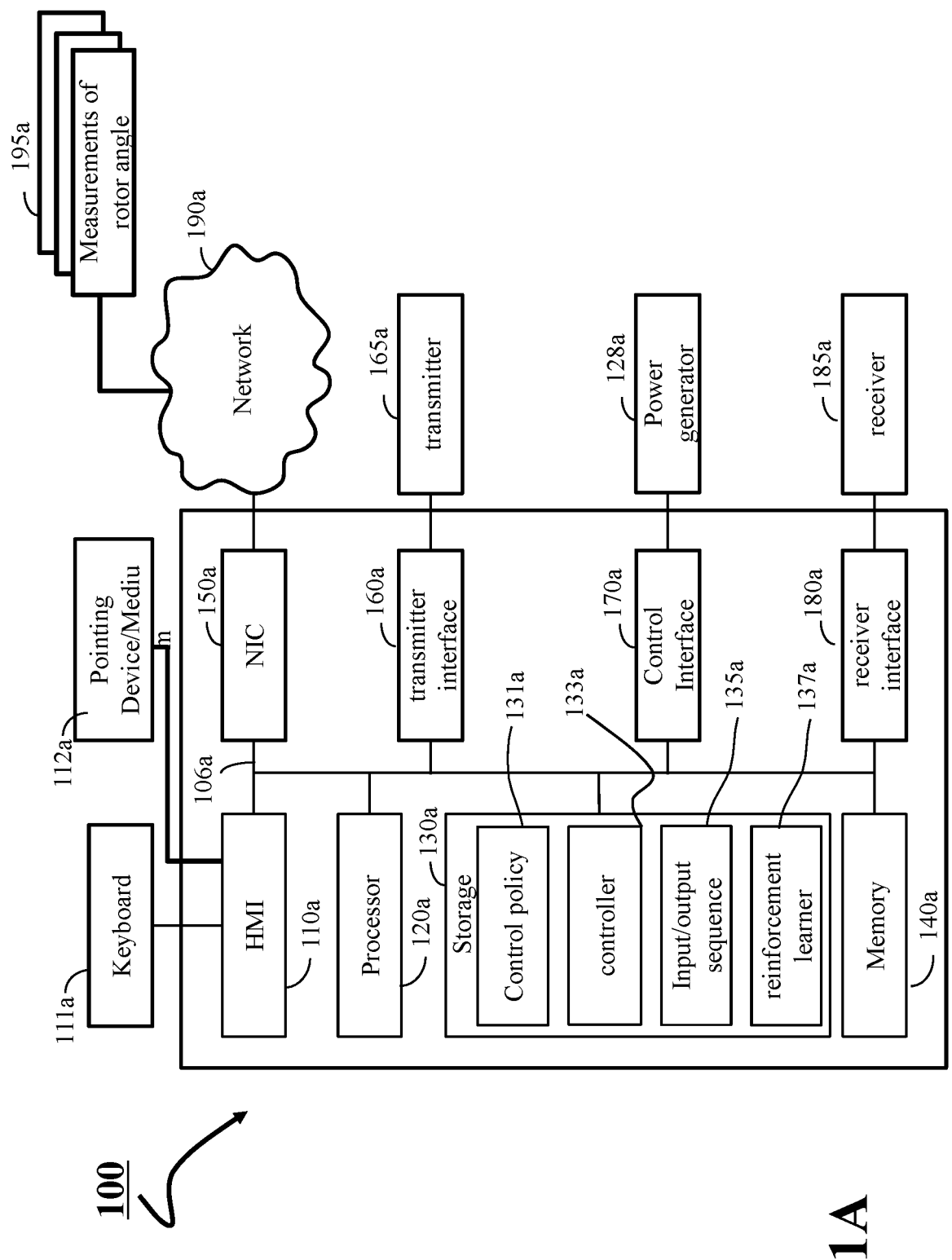
FIG. 1A shows a block diagram of a control system for controlling an operation of a power generator of a power generation system for providing power in accordance with some embodiments.

FIG. 1A shows a block diagram of a control system 100 for controlling an operation of a power generator of a power generation system for providing power in accordance with some embodiments. Examples of power generators include conventional power generation facilities, e.g., running on coal, and the renewable source of the energy, such as wind turbine farms and solar arrays. The power generation system can include multiple generators. The control of the power generators can be performed individually or collectively. The control system 100 uses a data-driven output-feedback control to control one or multiple power generators.

The control system 100 can have a number of interfaces connecting the system 100 with other systems and devices. A network interface controller 150a is adapted to connect the system 100 through the bus 106a to a network 190a connecting the control system 100 with the power generator 128a of the power generation system. For example, the control system 100 includes a transmitter interface 160a configured to transmit, using a transmitter 165a, a control command for an actuator of the generator 128a to reach a reference value. Through the network 190a, using a receiver interface 180a connected to a receiver 185a, the system 100 can receive measurements 195a of the operation of the controlled power generator. Additionally or alternatively, the control system 100 includes a control interface 170a configured to transmit commands to the generators to change their states. The control interface 170a can use the transmitter 165a to transmit the commands and/or any other communication means.

In some implementations, a human machine interface 110a within the system 100 connects the system to a keyboard 111a and pointing device 112a, wherein the pointing device 112a can include a mouse, trackball, touchpad, joy stick, pointing stick, stylus, or touchscreen, among others. The system 100 includes an output interface configured to output the control commands. For example, the system 100 can be linked through the bus 106a to a display interface adapted to connect the system 100 to a display device, such as a computer monitor, camera, television, projector, or mobile device, among others. The system 100 can also be connected to an application interface adapted to connect the system to equipment for performing various power distribution tasks.

The system 100 includes a processor 120a configured to execute stored instructions, as well as a memory 140a that stores instructions that are executable by the processor. The processor 120a can be a single core processor, a multi-core processor, a computing cluster, or any number of other configurations. The memory 140a can include random access memory (RAM), read only memory (ROM), flash memory, or any other suitable memory systems. The processor 120a is connected through the bus 106a to one or more input and output devices. These instructions implement a method for data-driven output-feedback control of a power generator of a power generation system.

For clarity of this disclosure, dynamics of an $i^{th}$ power generator of a power generation system is abstracted by a following continuous-time model $$\dot{\delta}_i = \omega_i$$

$$\dot{\omega}_i = -\frac{D_i}{H_i}\omega_i + \frac{\omega_0}{2H_i}(P_{mi} - P_{ei})$$

$$\dot{P}_{mi} = \frac{1}{T_i}(-P_{mi} + u_{gi})$$

$$P_{ei} = E_{qi}\sum_{j=1}^{N} E_{qj}(B_{ij}\sin\delta_{ij} + G_{ij}\cos\delta_{ij})$$

$$y_i = \delta_i$$

where $\delta_i$, $\omega_i$, $P_{mi}$, $P_{ei}$ denotes angle, relative rotor speed, mechanical power, and electric power respectively, $u_{gi}$, $y_i$ is the control input and output of the $i^{th}$ power generator respectively, $D_i$, $H_i$, $T_i$ is the damping constant, inertia constant, and the governor time constant, respectively, $E_{qi}$, $B_{ij}$, $G_{ij}$ is the transient electromotive force in quadrature axis, the imaginary and real parts of an admittance matrix, respectively, and $\delta_{ij}=\delta_i-\delta_j$ denotes the relative rotor angle between generators. It is clear the model is nonlinear, and the state of the $i^{th}$ power generator includes rotor angle $\delta_i$, relative rotor speed $\omega_i$, and mechanical power $P_{mi}$. Note that the model output is the rotor angle $\delta_i$. Also, model parameters such as $D_i$, $H_i$, $T_i$, $E_{qi}$, $B_{ij}$, $G_{ij}$ could be time-varying in practice.

In some embodiment, power generators of interests are connected to a power grid at the same point. All generators should share the angle, such that $\delta_{ij}=0$. Hence, a control for synchronization of all generators enforces $\delta_{ij}=0$. In another embodiment, when power generators of interests are connected to the power grid at different points, angles of all generators might be different. In such case, the reference angle $\delta^*_i$ for the ith generator angle is determined by a coordination controller on the upper level, according to the balance of power loads and electric powers. Hence, a control for synchronization of all generators enforces that $\delta^*_i-\delta_i$ iteratively goes to zero.

In many cases, the continuous-time generator model is discretized over time for a given sampling period. Its discretized model can be abstracted as $$x_j(k+1)=f_i(x_i(k))+g_i u_{gi}(k)$$

$$y_i(k)=\delta_i(k)$$

where $x_i=(\delta_i, \omega_i, P_{mi})$, k denotes the kth time step, $f_i$, $g_i$ are vectors which can be readily derived from the continuous-time model.

Some embodiments are based on recognition that it is possible to learn a data-driven control policy when the entire state of the controlled system is known, i.e., the state $x_i=(\delta_i, \omega_i, P_{mi})$ and input of the $i^{th}$ power generator are known, e.g., measured. This approach is referred as a state-feedback control. However, it is challenging to learn the entire state of the power generator including a rotor angle, a relative rotor speed, a mechanical power, and an electrical power in real time. Some embodiments are based on recognition that is possible to construct a control policy to track some outputs of the power generator. However, there is no guarantee that such a control policy is optimal and/or provides a stable control of the power generation system. This invention teaches means to synthesize data-driven feedback optimal control based on output $\delta_i$ and input.

Some embodiments are based on realization, that if the controlled system is uniformly observable, it is possible to learn the control policy directly from sequence of multiple values of inputs and outputs of controlled system without determining the state of the controlled system. Some embodiments are based on realization, that in this context, to have uniformly observable system of inputs and outputs it is sufficient that the inputs and outputs have injective mapping to a state of the system, i.e., there is one-to-one mapping of the state of the system to the inputs/outputs of the system, but there is no one-to-one mapping of the inputs/outputs to the state.

As an example, based on the continuous-time model of the $i^{th}$ power generator, some embodiments conclude that it is uniformly observable. This is verified in two steps. First, define the following observable coordinates $$\phi_0(x_i) = [\delta_i, \dot{\delta}_i, \ddot{\delta}_i] = \left[\delta_i, \omega_i, -\frac{D_i}{H_i}\omega_i + \frac{\omega_0}{2H_i}(P_{mi}-P_{ei})\right]$$

Second, verify its Jacobean matrix is non-singular, where the Jacobian matrix is given by $$\frac{\partial \phi_0(x_i)}{\partial x_i} = \begin{bmatrix} 1 & 0 & 0 \\ 0 & 1 & 0 \\ * & -\frac{D_i}{H_i} & \frac{\omega_0}{2H_i} \end{bmatrix}$$

where * is arbitrary.

Some embodiments are based on realization that there is an injective mapping between some inputs and outputs of the power generator to its state. Specifically, there is an injective mapping between the state of the power generator with values of excitation voltage that controls an actuation of the power generators, and values of a rotor angle caused by the operation of the power generator according to the excitation voltage. In such a manner, some embodiments are based on realization that is possible to learn a control policy from input-and-output sequence of values of the operation of the power generator including a sequence of multiple values of the rotor angle of the power generator and a corresponding sequence of multiple values of excitation voltage to the power generator causing the values of the rotor angle. In effect, this realization allows to design an optimal and stable control policy for controlling a power generator without a need to have an accurate model of the power generator and without a need to determine mechanical and electrical power of a power generator.

As an example, for the $i^{th}$ power generator, one embodiment first constructs an injective mapping on a sequence of output $\delta_i(k)$, $\delta_i(k-1)$, $\delta_i(k-2)$:

$$\phi_{mi}(\delta_i(k),\delta_i(k-1),\delta_i(k-2))=(\delta_i(k),\delta_i(k)-\delta_i(k-1),\delta_i(k)+\delta_i(k-2)-2\delta_i(k-1)).$$

By taking into account the discrete-time model of the power generator, one can verify the existence of an injective mapping between $\phi_{mi}(\delta_i(k), \delta_i(k-1), \delta_i(k-2))$ and $x_i(k)$. Therefore, there is an injective mapping from the sequence of control input and output $\delta_i(k)$, $\delta_i(k-1)$, $\delta_i(k-2)$ to $x_i(k)$.

Accordingly, the receiver 185a of the control system 100 is configured to accept a measurement 195a of a current value of an angle of a rotor of the power generator and a transmitter 165a is configured to submit the current value of the excitation voltage to an actuator of the power generator. The receiver and the transmitter establish communication between the control system and the power generator over a control and/or communication channel 190a. The channel can be wired or wireless, e.g., controlled with a network interface controller (NIC) 150a through bases 106a. The receiver receives the current value of the rotor angle at each instance of time. In such a manner, the control system can accumulate a sequence of values of rotor angles for different instances of time. Similarly, the transmitter transmits a current value of the excitation voltage to an actuator of the power generator at each instance of time. However, the control system can accumulate a sequence of values of excitation voltage for different instances of time.

To that end, the control system includes a memory 130a configured to store an input-and-output sequence 135a of values of the operation of the power generator including a sequence of multiple values of the rotor angle of the power generator and a corresponding sequence of multiple values of excitation voltage to the power generator causing the values of the rotor angle. The memory is also configured to store a control policy 131a mapping the input-and-output sequence to a current control input defining a current value of the excitation voltage. The control policy can be determined offline from the operational data of a power generator. Additionally or alternatively, the control policy can be determined and/or updated online during the operation of the power generation system.

Because the control policy is determined from and for the input-and-output sequence of pairs of values of the excitation voltage and the rotor angle, the control policy is data-driven. Because this control policy does not require the knowledge of full state and uses only inputs and outputs of the power generator, this control policy is referred herein as output-feedback control policy. In addition, some embodiments are based on observations, experimentation and mathematical proof that due to injective mapping between the input-and-output sequence of pairs of values of the excitation voltage and the rotor angle, the control policy is stable and iteratively approaches the optimal control policy.

To that end, the processor 120a is configured to iteratively control the power generator 128a using the control policy 131a. For an iteration, the processor is configured to execute, using a control module 133a, the control policy 131a to map the input-and-output sequence 135a to the current value of the excitation voltage, submit through the transmitter 165a the current value of the excitation voltage to the actuator of the power generator, accept through the receiver 185a the current value of the rotor angle caused by actuating the power generator according to the current value of the excitation voltage, and update the input-and-output sequence with the corresponding current values of the rotor angle and the excitation voltage. In effect, the control policy is a function of the input-and-output sequence of excitation voltages and rotor angles that allows avoiding determining mechanical and electrical power of the power generator. The update of the input-and-output sequence with the corresponding current values of the rotor angle and the excitation voltage allows to maintain the most relevant control data. For example, in some implementations, the processor, to update the input-and-output sequence, is configured to append the current values of the rotor angle and the excitation voltage to the end of the input-and-output sequence and remove the oldest pair of values of the rotor angle and the excitation voltage from the input-and-output sequence.

Some embodiments are based on understanding that there is a need to reduce a length of the input-and-output sequence to reduce the computational burden of learning and updating the control policy. Some embodiments are based on experimentation and mathematical proof that, to provide stable control, the lengths of the input-and-output sequence should be greater than one but does not have to be greater than the order of the system. In the context of power generation system, the order of the system is four, i.e., can be described by four differential equations. To that end, in some embodiments, the input-and-output sequence 135a includes four values of the rotor angle and four values of the excitation voltage. In effect, this embodiment allows reducing computational complexity without sacrificing the guarantees of the control.

The control policy 131a can be determined offline from the operational data of a power generator. Additionally or alternatively, the control policy can be determined and/or updated online during the operation of the power generation system. In some embodiments, the control system can include a reinforcement learner 137a configured to be executed by the processor 120a to update the control policy 131a recursively during the operation of the power generator. The control policy maps the input-and-output sequence to the current value of the excitation voltage using a nonlinear function learned with the reinforcement learning. In one implementation, the nonlinear function is a composite function of a nonlinear mapping between the current value of the excitation voltage and a state of the power generator and a function of nonlinear mapping between the state the power generator and the input-and-output sequence. In some implementations, the reinforcement learner 137a is using a reinforcement learning based on a training input-and-output sequence having a length greater than the length of the input-and-output sequence.

Examples of Data-Driven Output-Feedback Power Generation Systems

Some embodiments allow to controlling of electric power systems, and more particularly to distributed synchronization of microgrids with multiple points of interconnection. Some exemplar embodiments are set for interconnecting an isolated microgrid with adjacent power grids at multiple points of interconnections. In particular, a physical layer for the microgrid is an electrical network that includes a set of buses connected with transmission lines, and a set of controllable distributed generators, non-controllable distributed generators and loads. The communication layer is a communication network that provides communication links between the local controllers for controllable distributed generators for information exchange, which provides for synchronization that can be achieved iteratively.

Some embodiments provide a synchronization controller for some distributed generators of the microgrid. Such that upon receiving a request to connect to the microgrid from an adjacent power grid, the synchronization controllers of the microgrid can then identify the distributed generator connecting to the point of interconnection between the microgrid and the adjacent power grid to achieve synchronization using output-feedback control.

Figure 1B:
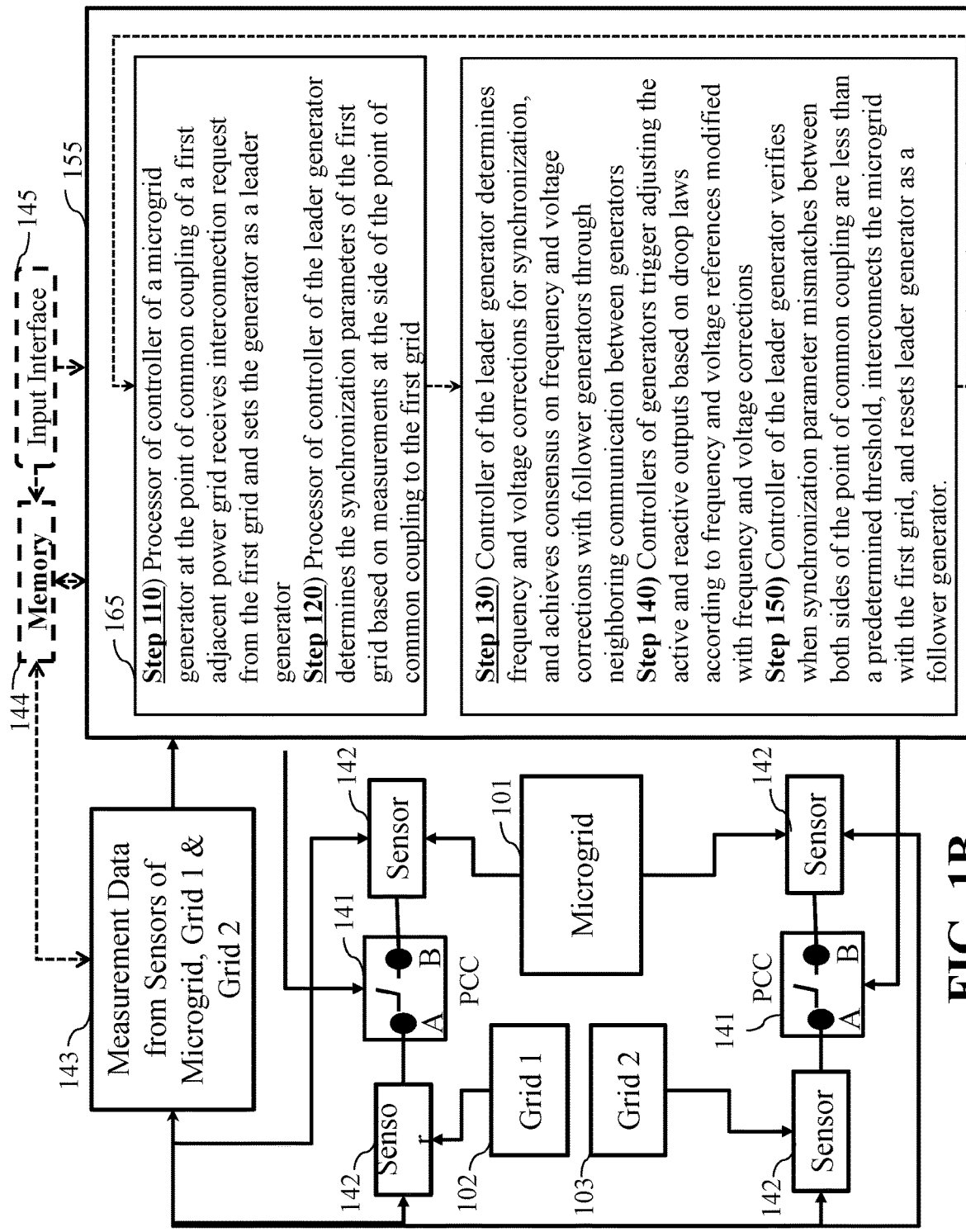
FIG. 1B is a schematic of exemplar synchronization method within a power generation system according to some embodiments.

FIG. 1B is a schematic of exemplar synchronization method within a power generation system according to some embodiments. The synchronization system 100 includes a microgrid 101, a first adjacent power grid 102, and a second or other adjacent power grid 103. A circuit breaker or switch installed at a point of common coupling A, B, 141 between the microgrid 101 and the first or other adjacent power grid 102, 103. Wherein the breaker or switch in an open position separates the microgrid 101 from the adjacent power grid 102 or 103, and in a close position connects the microgrid 101 with the adjacent power grid 102 or 103.

Still referring to FIG. 1B, the processors 165 of synchronization controllers of generators at the points of common coupling 141 between microgrid 101 and adjacent power grids 102 and 103 continuously monitors if there is an interconnection request received from the adjacent power grids (step 110). If a request is received, the corresponding generator acts as leader generator, and the processor continually determines the synchronization parameters for the identified adjacent grid to be interconnected from the measurements 143 collected from the sensors 142 (step 120).

Still referring to FIG. 1B, the processor 165 determines synchronization parameters for the microgrid 101 and the identified adjacent grid 102, or 103, at sides A, B of point of common coupling 141 (step 120). Wherein a first sensor 142 is located on a side A of the point of the common coupling for continually determining the synchronization parameters of the microgrid 101. A second sensor 142 is located on another side B of the point of the common coupling for continually determining the synchronization parameters of the adjacent power grid 102, or 103. Such that the synchronization parameters for the microgrid 101 and the adjacent power grid 102, or 103 are indicative of at least a frequency, a phase and a voltage.

The controller 155 of the leader generator determines frequency and voltage corrections for synchronization, and achieves consensus on frequency and voltage corrections with other generators through neighboring communication among generators (step 130). The controller 155 for each generator performs the output-feedback control of generators according to some embodiments to adjust their active and reactive outputs based on droop laws according to frequency and voltage references modified with frequency and voltage corrections (step 140). Finally the controller 155 of the generator verifies when synchronization parameter mismatches between both sides of the point of common coupling 141 are less than a predetermined threshold, connects the microgrid with the identified power grid by moving the breaker or switch position from the open position to the close position, and resets leader generator as a follower generator (step 150).

Optionally, the synchronization system 100 can store the continuous measurement data 143 in a computer readable memory 144, wherein the computer readable memory is in communication with the controller 155 and processor 165. Further, it is possible an input interface 145 can be in communication with the memory 144 and the controller 155 and processor 165. For example, a user via a user interface of the input interface 145 may input predetermined conditions, i.e. the predetermined mismatch thresholds.

Figure 1C:
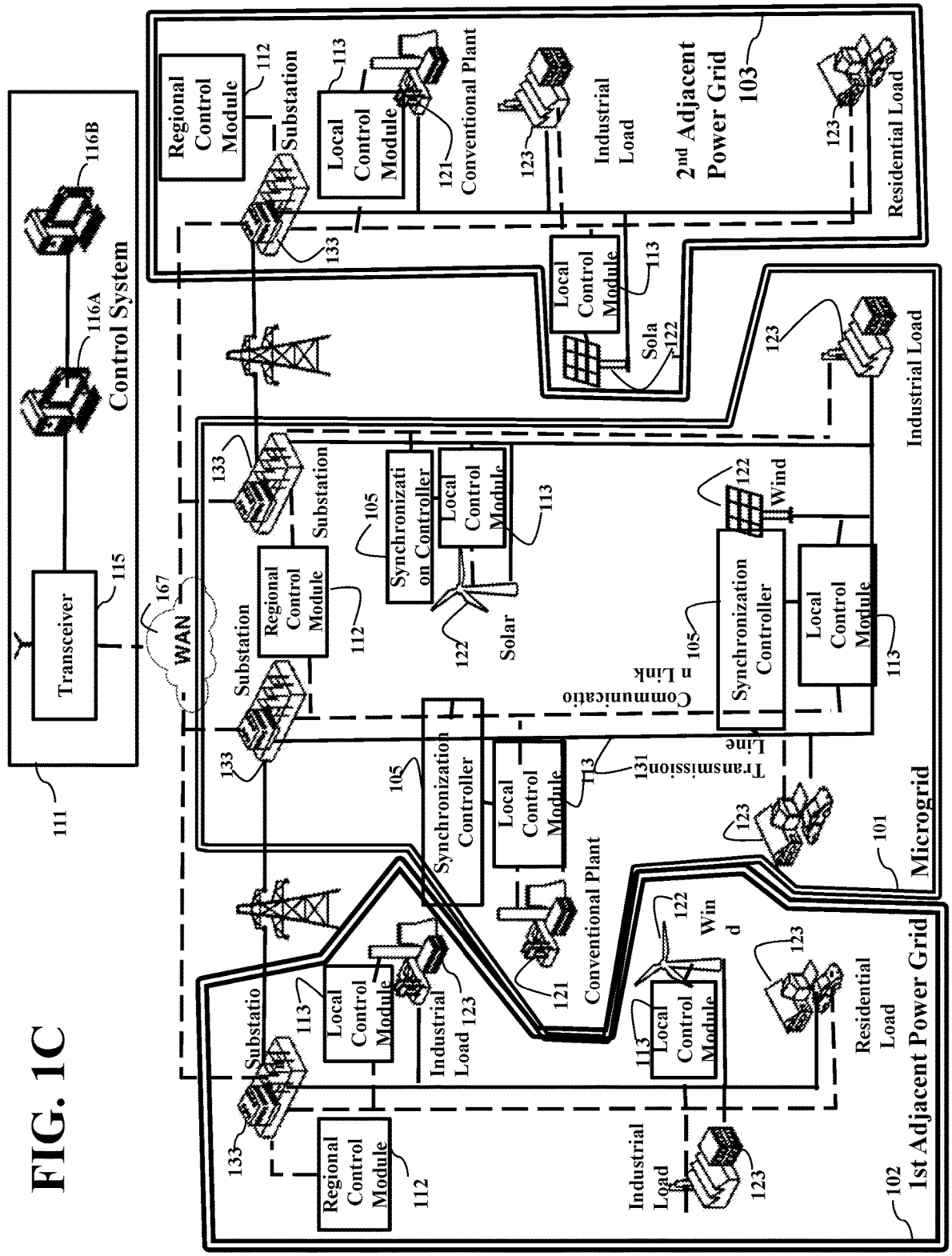
FIG. 1C is a schematic illustrating a synchronization method for interconnecting a microgrid with adjacent power grids according to some embodiments.

FIG. 1C is a schematic illustrating the distributed synchronization method for interconnecting a microgrid, 101 with adjacent power grids, 102 and 103, according to some embodiments. The power sources of the exemplar microgrid and adjacent power grids include the conventional power generation facilities 121, and the renewable source of the energy 122, such as wind turbine farms and solar arrays. The power consumers 123 of the exemplar microgrid and adjacent power grids include the industrial/commercial loads representative of industrial plant or large commercial enterprises, and/or the residential loads representative of residential customers. The power plants, 121 and 122 are coupled with the power consumers, 123 through the substations 133 and transmission lines 131. Associated with substations 133 is a regional control module 112.

The regional control module 112 manages power production, distribution, and consumption within its region. Different regions are interconnected with transmission lines 131, and the transmission lines can be closed or opened through the circuit breakers located in the substations 133. Each regional control module 112 is communicatively coupled to a centralized control system 111 via, e.g., a wide area network 167. The power plant interfaces with the regional grid via a local control module 113. The local control module 113 can standardize control command responses for generator on/off status change and generation level adjustments issued by regional control module 133 or the centralized control system 111.

Still referring to FIG. 1C, the control system 111 includes a transceiver 115 for exchanging data between the control system and regional control modules 112 via the network 167. Also, the centralized control system 111 includes one or several processors 116A and 116B to manage the operation and control of the power system, including the microgrid, 101 and adjacent power grids, 102 and 103. The control system 111 is operable to manage the interaction of several regional control modules 112 and the power plants under their control. To that end, the centralized control system 111 make decisions for regional grid interconnection or major generator connection to the grid. The regional control module 112 makes the decision for connecting local stand-alone operated generators into its regional grid. For example, the control system 111 can issue a command to the regional control module 112 to connect its controlled regional grid with an adjacent regional grid. The synchronization controllers 105 described by some embodiments of the disclosure are used to support synchronization of the microgrid 101 with adjacent grids, 102 and 103.

Still referring to FIG. 1C, the synchronization controllers are installed for each generator of power generation plants, 121 and 122 within the microgrid 101 for supporting the synchronization of the microgrid 101 with adjacent grids 102 or 103. If the generator is located close to the point of common coupling between the microgrid and the adjacent power grid to be interconnected, it uses the local measurements collected from both sides of the circuit breaker or switch between the microgrid and the identified adjacent power grid, and sum of required synchronization corrections from synchronization controllers of neighboring generators to simultaneously regulate the frequency and voltage by adjusting the active and reactive powers of the generator during the synchronization process using the output-feedback control. When an interconnection command is issued either by the regional control module 112, or by the centralized control system 111, the synchronization controllers 105 activate the synchronizing process, and close the circuit breaker or switch at the substation 133 when predetermined thresholds are met for differences of synchronization parameters between two grids to be connected. The synchronization parameters may include frequency, phase angle, voltage amplitude, and phase sequence. The grid interconnection command can be made when there is a need in the power system, such as sudden load changes.

Still referring to FIG. 1C, the control of generators, 121 and 122 can be structured into hierarchical levels, including primary, secondary, and tertiary controls. The primary control is realized in the local control module 113 using droop laws whose primary objectives are to maintain synchronism and achieve weighted power sharing among generators. The secondary control can be implemented either in a centralized manner by implemented in the regional control module 112, or in a distributed manner by implemented in the local control module 113. The goal of the secondary control is to eliminate the steady-state deviations between the microgrid frequency and voltage and their nominal values that caused by droop control without disturbing the power sharing and synchronism among the generators. The tertiary control is implemented in the centralized control system 111 to perform functions such as optimizing the active and reactive power exchange between the microgrid and the adjacent power grids based on the prevailing energy prices, market conditions, and information from the independent system operators. The synchronization control 105 is built upon the local control module 113 for each generator in the power plants of the microgrid to share the responsibility for interconnecting the microgrid, 101 with adjacent power grids, 102 or 103.

Figure 1D:
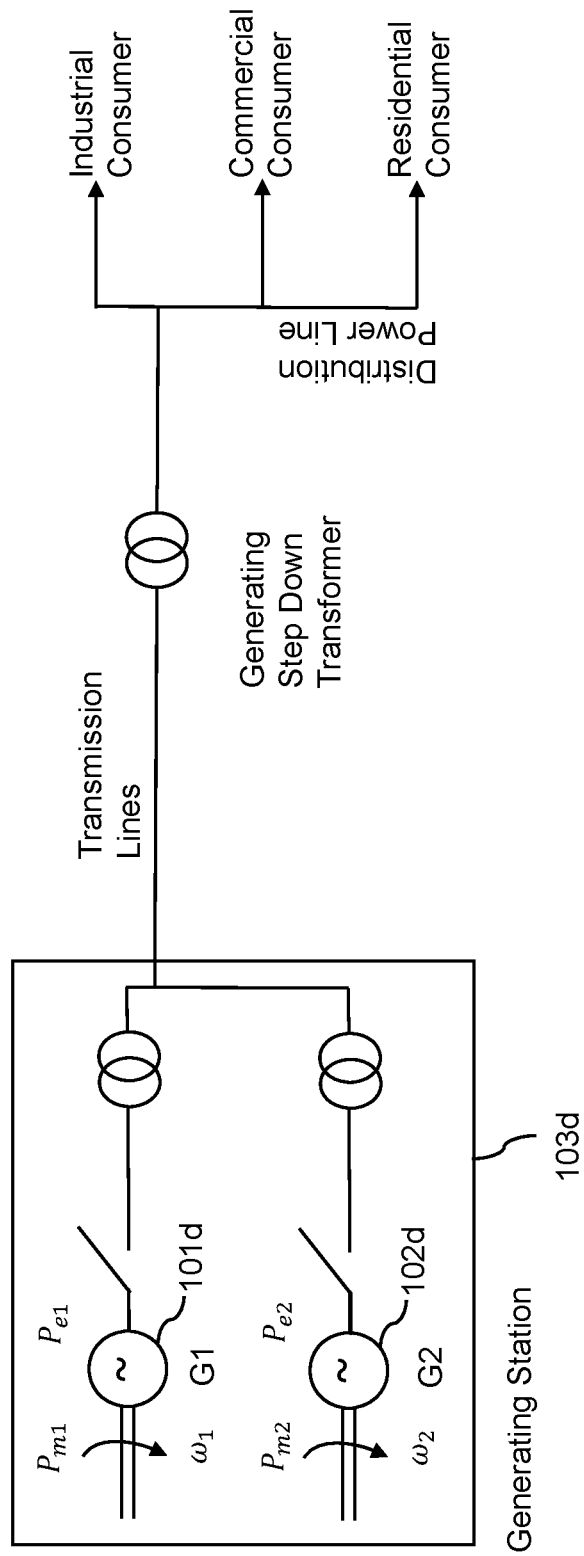
FIGS. 1D and 1E show schematics of measurements in power generation systems having unknown internal dynamics according to some embodiments.
Figure 1E:
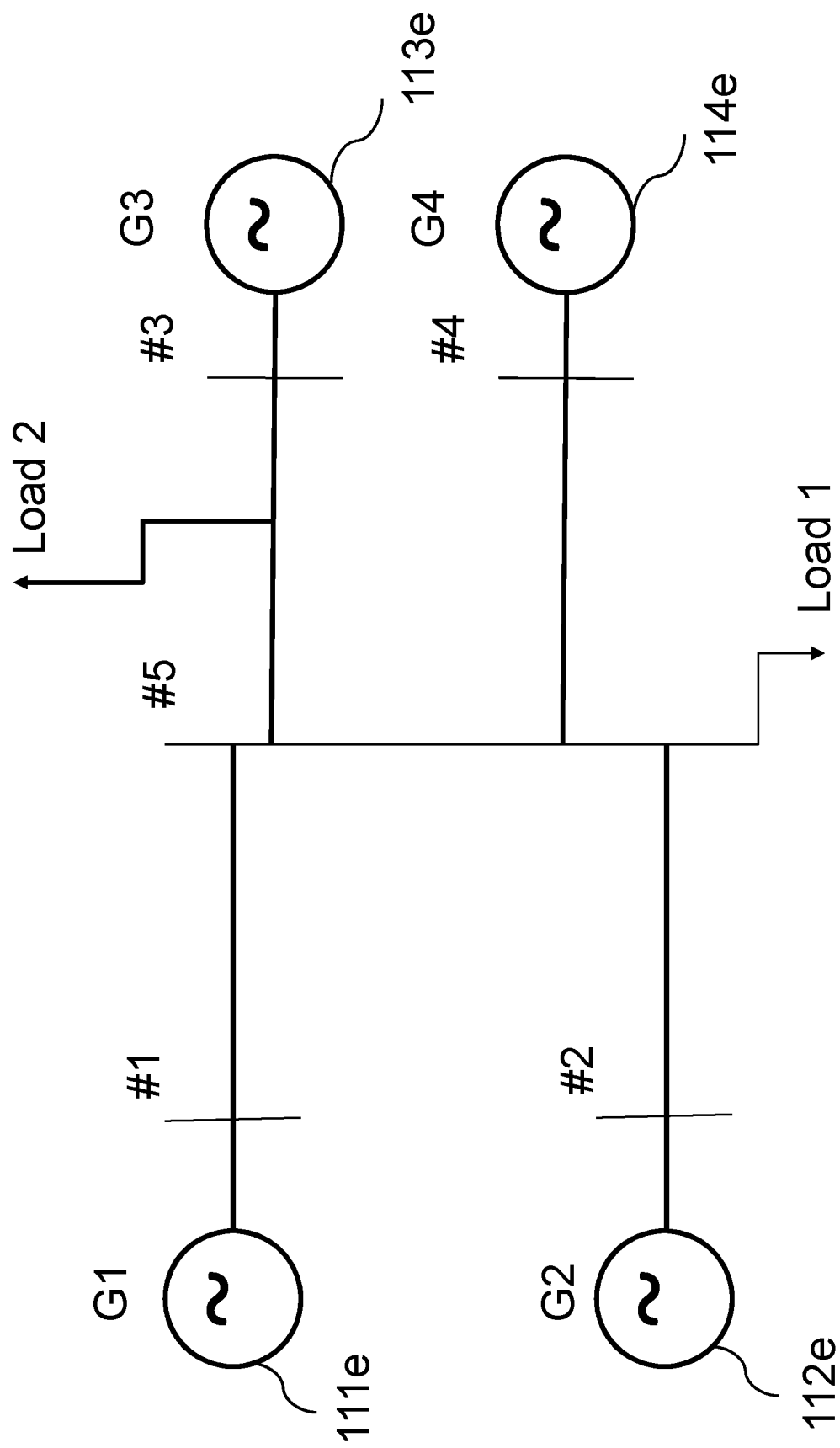

FIGS. 1D and 1E show schematics of measurements in power generation systems having unknown internal dynamics according to some embodiments. FIG. 1D shows a synchronization of two generators feeding different consumers including one or combination of industrial consumer, commercial consumer and residential consumer. The rotor angle sensors are installed in two generators (101$d$, 102$d$) in the generating station (103$d$), respectively. FIG. 1E shows another embodiment of the multi-machine power control systems, where rotor angle sensors (111$e$,112$e$,113$e$,114$e$) are put in generators G1-G4, respectively. By installing rotor angle sensors, the power control system has ability to collect online measurement of rotor angles. The online measurement and the data-driven control strategy work together to improve the performance of the power control system performing some specific tasks. Examples of rotor angle sensors include optical encoder, capacitive, magnetic sensors. In some implementations, the rotor speed, mechanical and electrical powers are not measured by extra sensors.

Microgrid

Figure 2A:
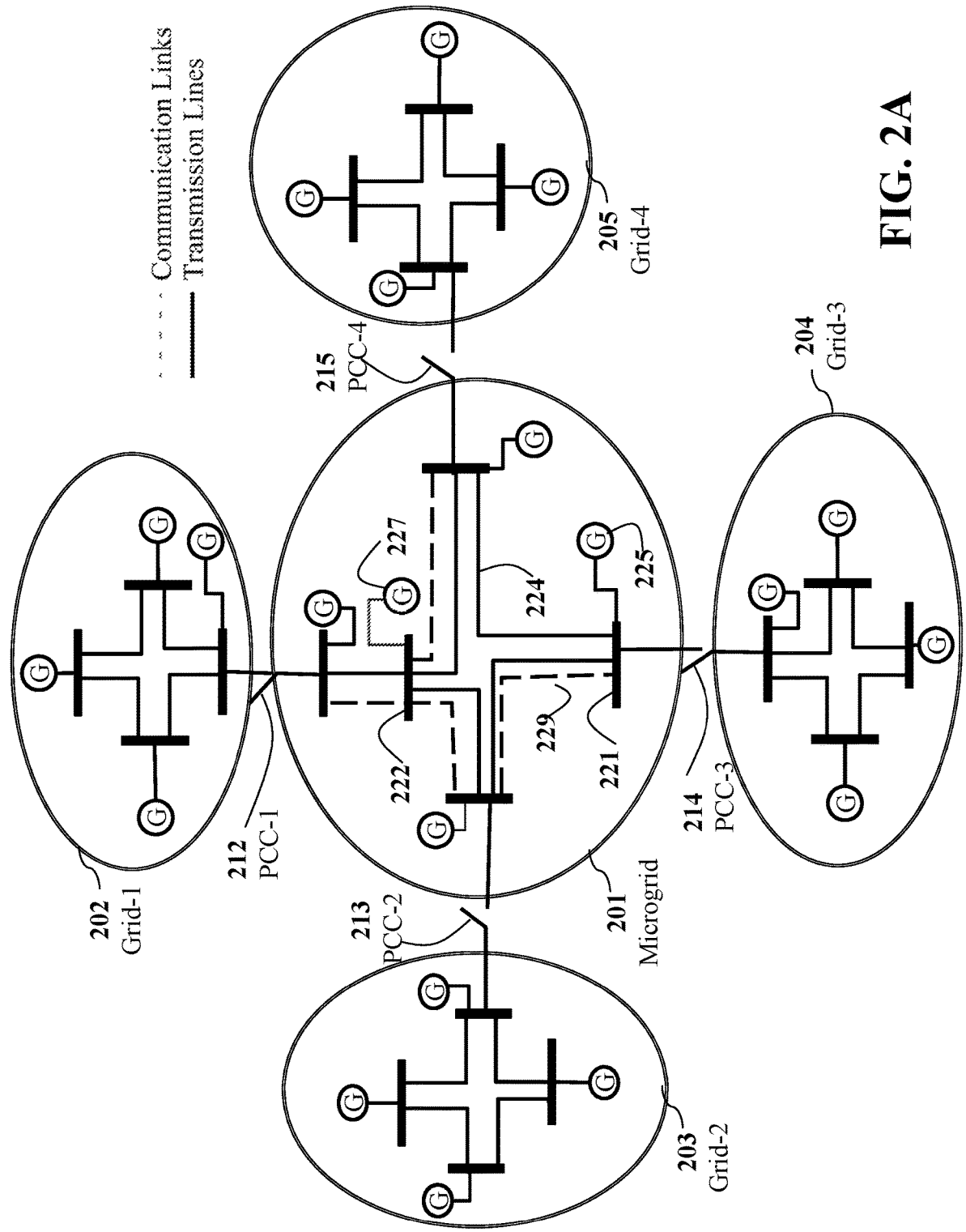
FIG. 2A shows a schematic diagram illustrating an example of a microgrid synchronization according to some embodiments.

FIG. 2A shows a schematic diagram illustrating an example of a microgrid synchronization with adjacent power grids with multiple points of common coupling (PCCs), according to some embodiments. In FIG. 2A, the microgrid 201 has 4 different points of common coupling (PCC), PCC-1 212, PCC-2 213, PCC-3 214 and PCC-4 215 that enable the microgrid 201 connecting with adjacent power grids, Grid-1 202, Grid-2 203, Grid-3 204, and Grid-4 205. The adjacent grid can be a main power grid, or one other microgrid. Each point of common coupling is connected with one bus of the microgrid 201 with one bus of adjacent power grid through an open circuit breaker, or switch.

The microgrid 201 includes a set of distributed generators, 225 and 227 which are connected with the microgrid 201 through buses 221 and 222 and transmission lines 224. Some buses 221 are connected with the points of common coupling, and the generator connected to such buses, 225 are treated as leader generator during the synchronization process. Some other buses 222 are not connected with the points of common coupling, and the generator connected to those buses, 227 are treated as follower generator during the synchronization process. The control/state signals for distributed generators are exchanged through corresponding communication links 229 between neighboring generators. The configuration of communication network is reconfigured based on the point of common coupling to be used, and the operation states of microgrid. Through the communication network, the synchronization controller of each generator can exchange the synchronization control/state information with its neighboring generator controllers. If the generator is a leader generator, its synchronization control also can get the synchronization parameters at both sides of the point of common coupling between the microgrid and the adjacent power grid.

The distributed generator in the microgrid can be a machine based generator which commonly used by a conventional power plant, or a converter based generator which commonly used by a power plant with renewable energy. Although the internal controls of different types of generators may be very different and same functions may be implemented at different time scales, both the machine and converter based generators can be represented as voltage source whose amplitude and frequency can regulated by the system-level control according to the operation needs of the microgrid. Essentially, the internal controls of a generator help realize the voltage source behavior with controllable voltage amplitude and frequency. Since internal control functions are much faster than the system-level control, they do not interfere with the system control dynamics. Some generators may not participate in the system-level control for maintaining the stability of microgrid voltage and frequency. They only feed active and reactive powers to the microgrid and can be appropriately called non-controllable generators instead of the controllable generators that participate in maintaining the grid voltage and frequency. The non-controllable generators can be treated as loads with negative power demands. As system level control, the synchronization of the microgrid with adjacent power grids is achieved by controlling of controllable distributed generators within the microgrid.

Figure 2B:
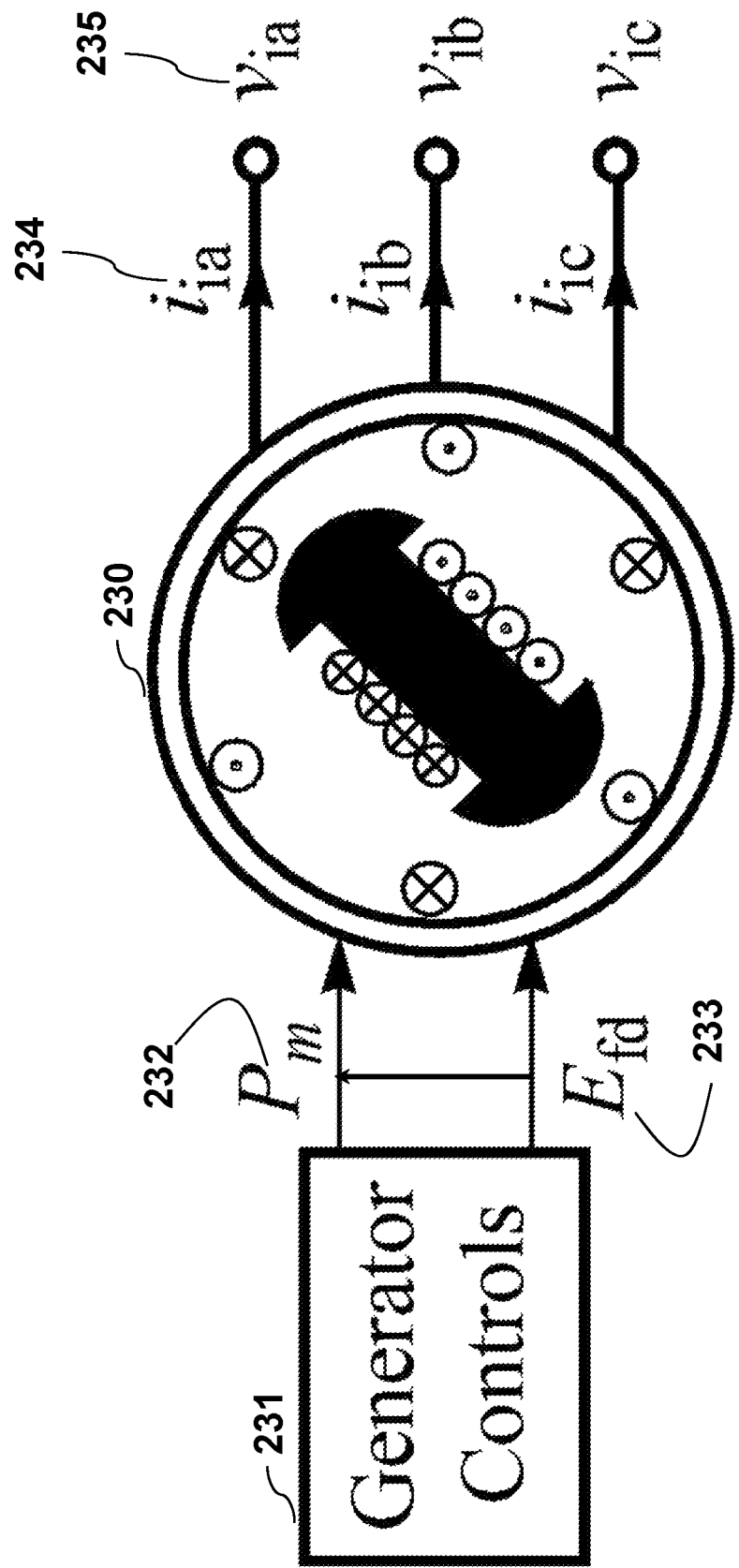
FIG. 2B shows a schematic diagram illustrating a power generator controlled by output-feedback control according to some embodiments.

FIG. 2B shows a schematic diagram illustrating a power generator 230 controlled by output-feedback control according to some embodiments. In this example, the generator outputs three phase voltages and currents, 235 and 234. The frequency and magnitude of the voltages can be regulated through controlling the mechanical input power 232, e.g., rotation of a turbine of a power generator. Such a mechanical input power can in turn be controlled by excitation voltage 233 determined by output-feedback controller 231.

Figure 2C:
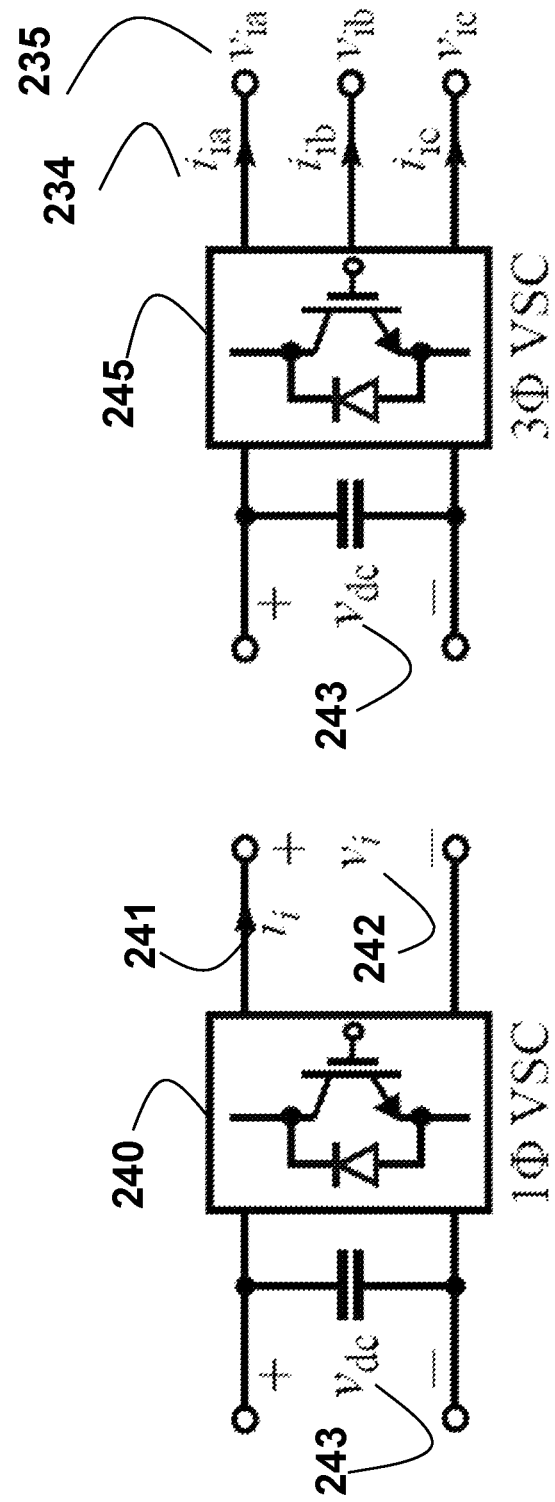
FIG. 2C shows a schematic diagram illustrating converter based controllable generators according to some embodiments.

FIG. 2C shows a schematic diagram illustrating converter based controllable generators, including a single-phase voltage source converter (VSC), 240 and a three-phase voltage source converter, 245, according to some embodiments. The single-phase and three-phase converters, 240 and 245 provides single-phase AC voltage and currents, 242 and 241, and three-phase AC voltages and currents, 235 and 234 by converting energy resource from DC source 243 into AC sources, respectively.

Figure 2D:
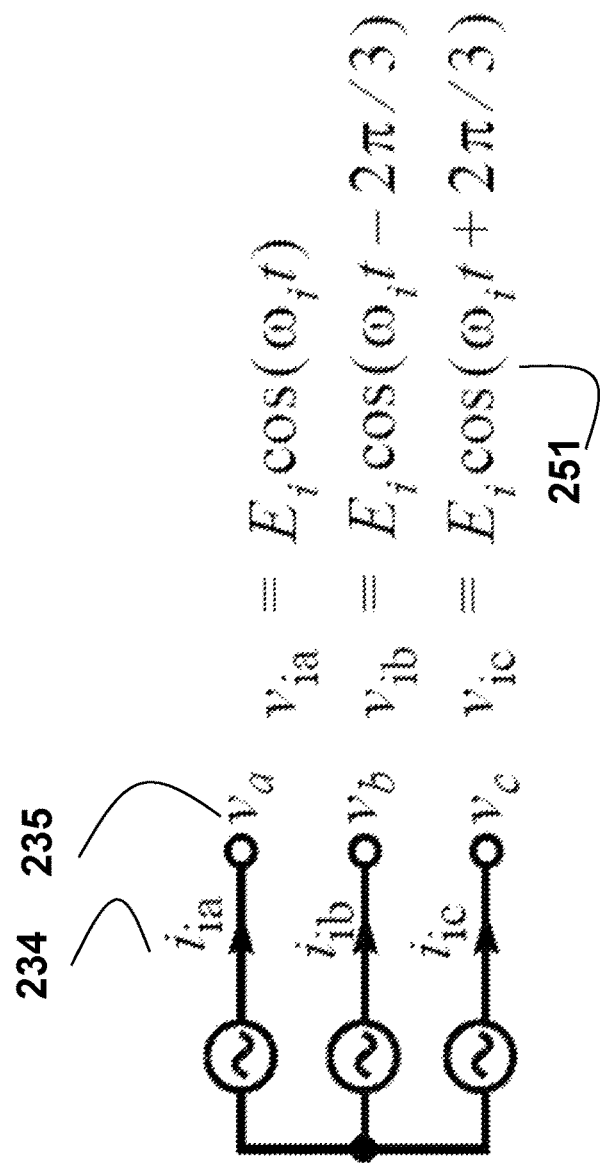
FIG. 2D shows a schematic diagram illustrating equivalent representation of single and three phase generators for primary and secondary level controls according to some embodiments.
Figure 2D:
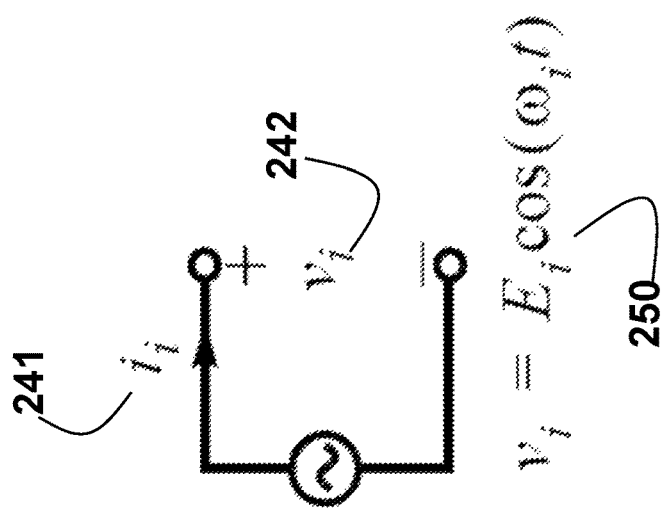

FIG. 2D shows a schematic diagram illustrating equivalent representation of single and three phase generators for primary and secondary level controls, which regulate the generator output voltage $E_i$ and frequency $\omega_i$ 251 according to some embodiments. A single phase generator 250 generates AC voltage and current only on a given phase, 242 and 241. In comparison, a three phase generator can generate AC voltages and currents, 235 and 234 on all three phases.

Some embodiments are based on understanding that when two or more synchronous generators are interconnected, their stator voltages and currents must have the same frequency and the rotor speed of each is synchronized to this frequency. That is the rotors of all interconnected synchronous generators must be in synchronism, because lack of sufficient synchronization results in system instability oscillation in rotor angles. As further illustrated in the generator model, the rotor angles of generators determine electric powers injected into the power grid. To balance the power load and power generation, an upper-level coordination controller typically schedules rotor angle references for all power generators. To that end, some embodiments represent the synchronization of power generator problem as an optimal control of the rotor angle towards its reference value.

Take an power generator as an example. Define $\delta_i$ as its angle, and $\delta^*_i$ as its reference. Then, the angle error is defined by $\Delta\delta_i := \delta_i - \delta^*_i$. The reference $\delta^*_i$ could be provided by a coordination controller according to load balancing. Here, we hope the angle errors of all the generators asymptotically converge to 0 eventually, $$\text{i.e., } \lim_{t \to \infty} \Delta\delta_i(t) = 0,$$

for i=1, 2, 3, ; ; ; .

In one embodiment, the power generation system includes multiple generators, and the control policy is trained to drive asymptotically a relative angle between generators to a zero value. This case happens in the recognition that before connecting some generators to power grid, they should be synchronized with the grid first. Since there is not power flow between the grid and these generators, the angles of these generators should be exactly the same to a specified value, wherein the specified value could be obtained from the coordination controller. Another applicable scenario is that power generators connecting to the power grid at the same point usually have the same rotor angle reference.

In some embodiment, synchronization of rotor angles means all power generators' rotor angles are the same. In a broad sense, synchronization of rotor angles means all power generators' rotor angles track their references respectively. In many cases, the reference rotor angle changes much slower than the rotor angle, due to the fact that power load changes slowly. Hence, in this example, the reference rotor angle can be viewed as a constant.

Accordingly, in some embodiments, the control policy is trained to control the rotor angle according to a reference trajectory. To that end, the control policy accepts as an input the reference trajectory. Additionally or alternatively, the reference trajectory can be a constant reference rotor angle.

In one embodiment, the value of the constant reference rotor angle is known in advance, and the control policy is trained for that value. In effect, this embodiment allows to avoid adding and/or processing additional control input by the control policy.

Generator Control

Figure 3A:
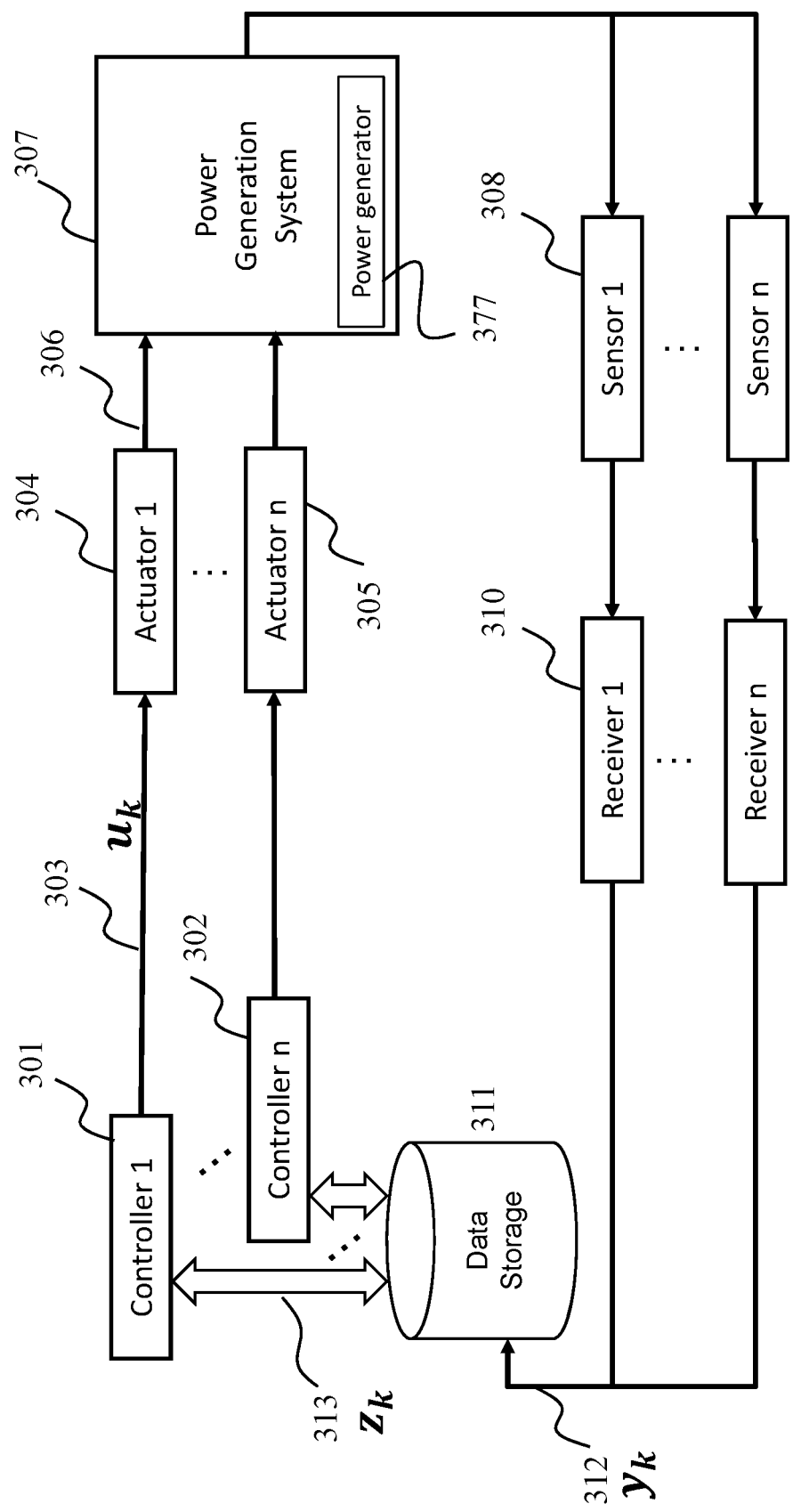
FIG. 3A shows a schematic of a data-driven output-feedback control of a power generator of a power generation system according to some embodiments.

FIG. 3A shows a schematic of a data-driven output-feedback control of a power generator of a power generation system according to some embodiments. The power generation system 307 can include one or multiple power generators 377. Sensors 308, such as a rotor angle sensor, measure output of each power generator under output-feedback control. These measurements are then passed to the receivers 310 of each generator. The controllers 301, 302 of each generator produce a corresponding control command 303, which is executed 306 by the generators of the power generation system through actuators 304, 305.

The output signal 312 does not represents the full state. For instance, the signal 312 corresponds to rotor angles of all generators. The rotor angles are stored in the data storage 311. Similarly, the control inputs, the values of the excitation voltage 303, are also stored in the data storage 311. In such a manner, the controllers 301 and 302 generates a control signal based on the input-output sequence $z_k$ 313 formed by pairs of values of rotor angles and excitation voltages.

Figure 3B:
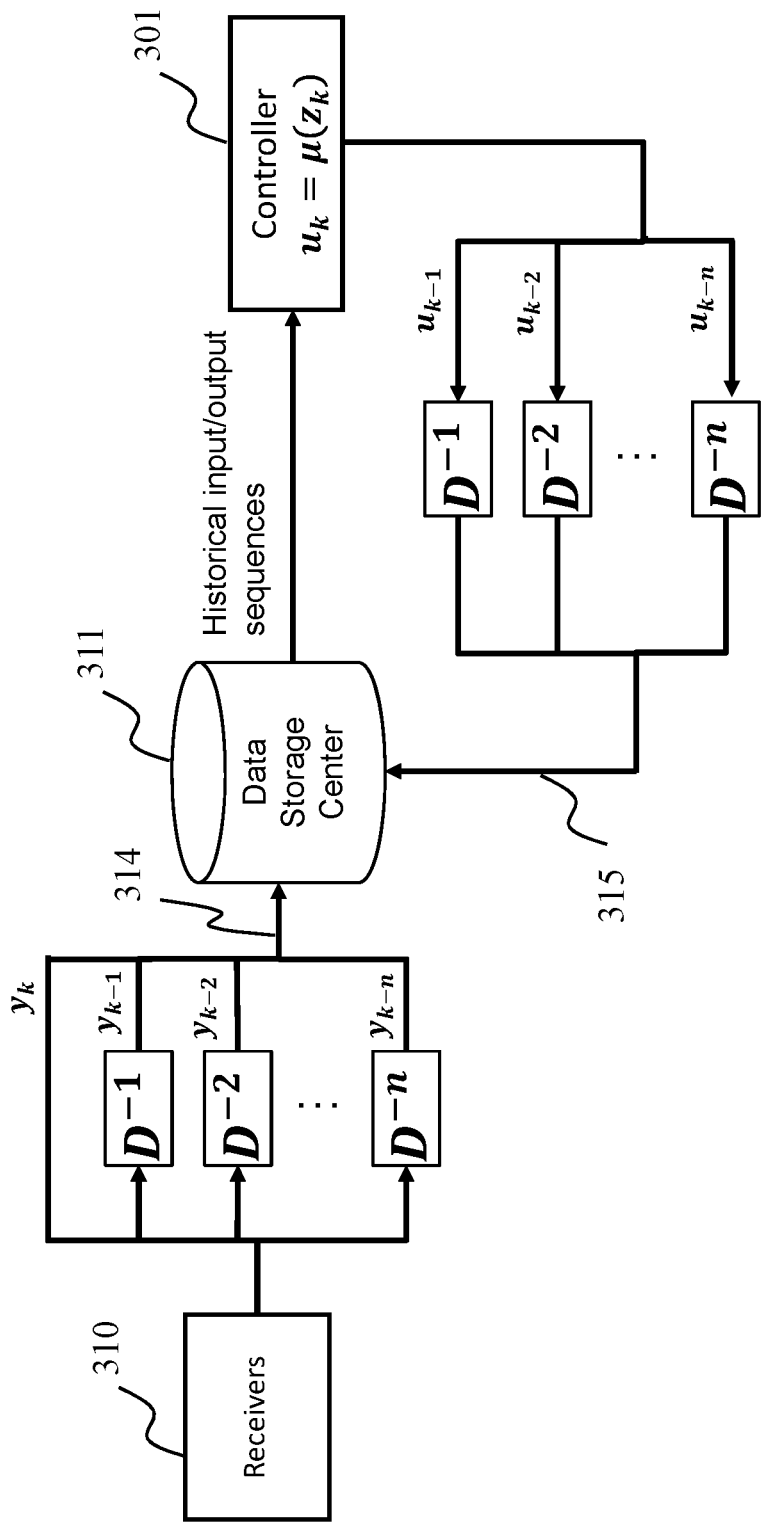
FIG. 3B shows a schematic of updating the data storage with the input-output sequence 313 formed by pairs of values of rotor angles and excitation voltages according to some embodiments.

FIG. 3B shows a schematic of updating the data storage with the input-output sequence 313 formed by pairs of values of rotor angles and excitation voltages according to some embodiments. According to the embodiments, a current control input signal is determined by submitting the latest historical values of control inputs 315 and outputs 314 to the control policy, which the historical signals are stored in the data storage center 311. In some implementations, the lengths of the sequences used as feedback is greater than one but no greater than the order of the system n.

The control policy used by controllers 301-302 can be determined offline from the operational data of a power generator. Additionally or alternatively, the control policy can be determined and/or updated online during the operation of the power generation system. In some embodiments, the control systems include a reinforcement learner configured to be executed by the processor to update the control policy recursively during the operation of the power generator using a reinforcement learning based on a training input-and-output sequence having a length greater than the length of the input-and-output sequence.

Figure 4A:
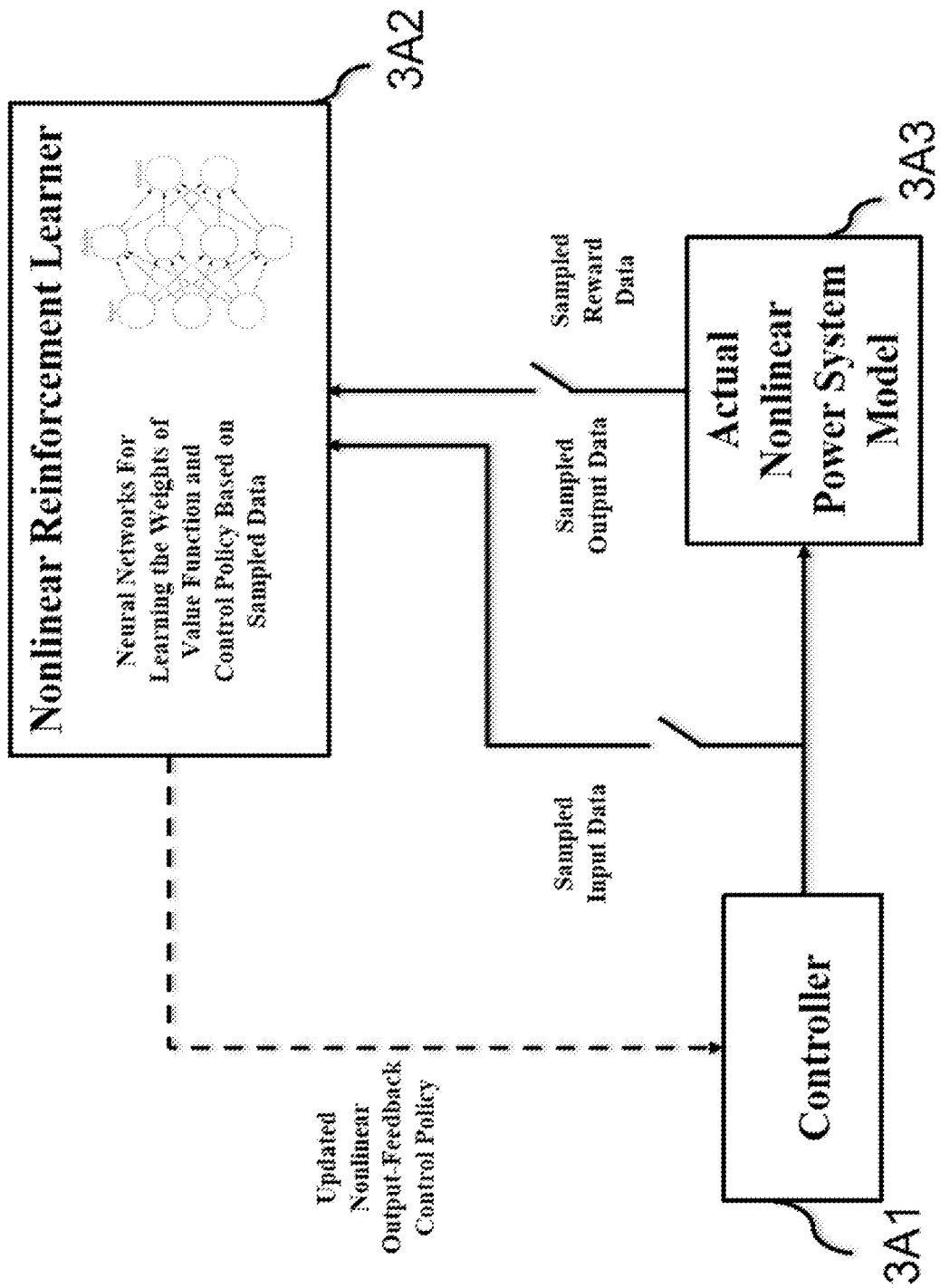
FIG. 4A shows a schematic of a data-driven method for determining the optimal control policy according to some embodiments.

FIG. 4A shows a schematic of a data-driven method for determining the optimal control policy according to some embodiments. The control policy maps the input-and-output sequence to the current value of the excitation voltage $u_k$ for the power systems according to online sampled measurements from the power generation system (3A3). The online sampled measurements include input, output, and reward data. The reward is associated with a predefined cost function relating the system performance. The optimal controller is designed by the reinforcement learner 2A2 to minimize a cost function. In some embodiments, the reinforcement learning based on a training input-and-output sequence having a length greater than the length of the input-and-output sequence In some embodiments, a nonlinear reinforcement learner (3A2) estimates a value function and control policy by iterations without the reliance on the knowledge of power system model and parameters. For example, the reinforcement learning constructs a value function as a function of the input-and-output sequence and updates the control policy based on the value function. In some implementations, the reinforcement learning approximates one or combination of constructing the value function and updating the control policy using a neural network. For example, the value function and control policy are approximated by using neural network techniques whereby both functions are parameterized by basis functions and corresponding weights of basis functions are learned and updated iteratively. Notably, basis functions only depend on system input and output, instead of inaccessible state. The updated nonlinear output-feedback control policy is implemented through the controller module (3A1) which improves the performance the power system.

For example, in one embodiment, the control is described by a nonlinear time-invariant discrete-time system $$x_{k+1}=f(x_k)+g(x_k)u_k, y_k=h(x_k), \quad (1)$$

where subscript k represents the kth time step, $x_k \in R^n$ is the state of the power system, $u_k \in R^m$ is the control input, and $y_k \in R^r$ is the system output. All components in vectors $f:R^n \to R^n$, $g:R^n \to R^m$ and $h:R^n \to R^r$ are locally Lipschitz functions with $f(0)=0$ and $h(0)=0$. The dimension of system output is typically lower than that of the system state.

For a power system including a group of synchronous generators, the state $x_k$ comprises of rotor angle, relative rotor speed, and mechanical power of all generators at time step k; $u_k$ is a vector with the ith element corresponding to the control input of the ith generator at time step k; $y_k$ is a vector with the ith element corresponding to the output of the ith generator at time step k. Vectors f, g can be readily derived from the model of the ith generator.

In one embodiment, the optimal operation of the power control system can be achieved by minimizing some cost function. One example of the cost function is $$J = \sum_{k=0}^{\infty} (Q(y_k) + u_k^T R u_k) \quad (2)$$

where $Q: R^r \to R$ is a positive definite function, and $R \in R^{m \times m}$ is a positive definite matrix.

The optimal output-feedback control design problem is to develop a control policy such that the cost in (2) is minimized, using only input and output. By optimal control theory, the optimal control policy can be found by $$u_k^*(x_k) = \operatorname{argmin}_{u_k}\left(\sum_{k=0}^{\infty} Q(y_k) + u_k^T R u_k\right), \quad (3)$$

$$V^*(x_k) = \min_{u_k}\left(\sum_{k=0}^{\infty} Q(y_k) + u_k^T R u_k\right) \quad (4)$$

where $V^*(x_k)$ is the value function in correspondence with the optimal control policy $u^*_k(x_k)$. In many cases, the value function $V^*(x_k)$ and optimal control policy are unknown and difficult to obtain from (3)-(4).

If the value function $V^*: R^n \to R$ is continuous differentiable, through Bellman's optimality principle, $V^*(x_k)$ is the solution to following Hamilton-Jacobi-Bellman (HJB) equation $$V^*(x_k) = Q(y_k) + \frac{1}{4}\frac{\partial V^T(x_{k+1})}{\partial x_{k+1}}g(x_k)g^T(x_k)\frac{\partial V^*(x_{k+1})}{\partial x_{k+1}} + V^*(x_{k+1}). \quad (5)$$

Accordingly, the optimal control $u^*_k(x_k)$ can be written explicitly $$u^*_k(x_k) = \frac{-1}{2}g^T(x_k)\frac{\partial V^*(x_{k+1})}{\partial x_{k+1}}. \quad (6)$$

Some embodiments are based on realization, that if the controlled system is uniformly observable, it is possible to learn the control policy directly from sequence of multiple values of inputs and outputs of controlled system without determining the state of the controlled system. Some embodiments are based on realization, that in this context, to have uniformly observable system of inputs and outputs it is sufficient that the inputs and outputs have injective mapping to a state of the system, i.e., there is one-to-one mapping of the state of the system to the inputs/outputs of the system, but there is no one-to-one mapping of the inputs/outputs to the state.

Some embodiments are based on realization that there is an injective mapping between some inputs and outputs of the power generator to its state. Specifically, there is an injective mapping between the state of the power generator with values of excitation voltage that controls an actuation of the power generators, and values of a rotor angle caused by the operation of the power generator according to the excitation voltage. In such a manner, some embodiments are based on realization that is possible to learn a control policy from input-and-output sequence of values of the operation of the power generator including a sequence of multiple values of the rotor angle of the power generator and a corresponding sequence of multiple values of excitation voltage to the power generator causing the values of the rotor angle. In effect, this realization allows to design an optimal and stable control policy for controlling a power generator without a need to have an accurate model of the power generator and without a need to determine mechanical and electrical power of a power generator.

Figure 4B:
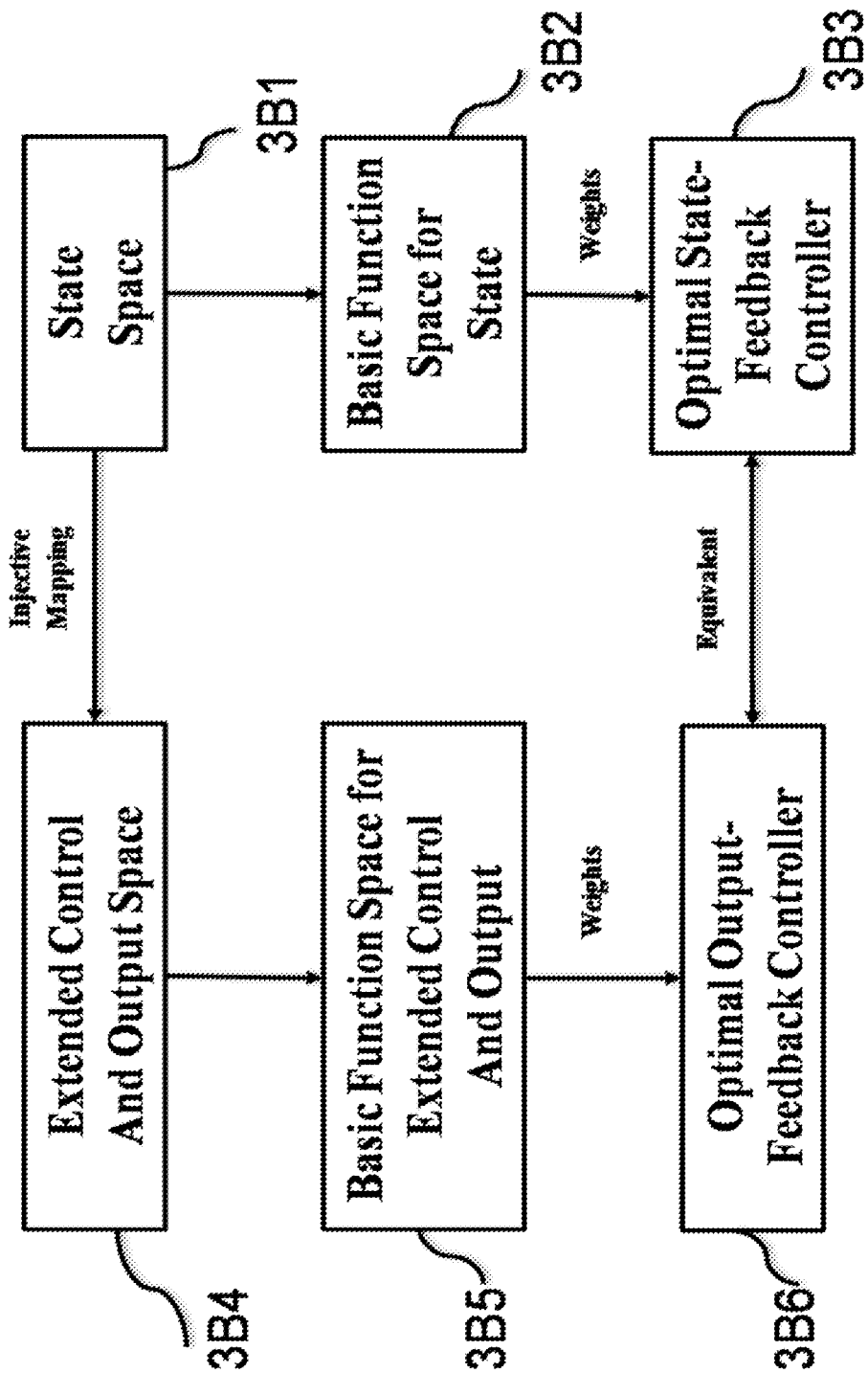
FIG. 4B shows a schematic of principles of injective mapping used by some embodiments.

FIG. 4B shows a schematic of principles of injective mapping used by some embodiments. Specifically, the equivalence of the optimal state-feedback controller (3B3) and the optimal output-feedback controller (3B6) is based on the existence of injective mapping from state-space (3B1) to extended control and output space (3B4). One embodiment is concentrated on the reconstruction of the state using historical input and output information, but without the exact model of the power system. Let $U_{[k-n,k-1]}$ and $Y_{[k-n,k-1]}$ denote two vectors of n consecutive input and output measurements, respectively:

$$U_{[k-n,k-1]}=[u_{k-n},u_{k-n+1},\ldots,u_{k-1}]^T,$$

$$Y_{[k-n,k-1]}=[y_{k-n},y_{k-n+1},\ldots,y_{k-1}]^T.$$

For the purpose of simplicity, denote $f^u(x)=f(x)+g(x)u$. In this way, sequences of input and output measurements can be written as follows $$x_k = \Phi(x_{k-n}, U_{[k-n,k-1]}),$$

$$Y_{[k-n,k-1]} = H(x_{k-n}, U_{[k-n,k-1]}) \text{ where}$$

-continued $$\Phi(x_{k-n}, U_{[k-n,k-1]}) = f^{u_{k-1}} \circ f^{u_{k-2}} \circ \ldots \circ f^{u_{k-n}}(x_{k-n})$$

$$H(x_{k-n}, U_{[k-n,k-1]}) = \begin{bmatrix} h(x_{k-n}) \\ \vdots \\ h \circ f^{u_{k-2}} \circ \ldots \circ f^{u_{k-n}}(x_{k-n}) \end{bmatrix}.$$

It is checkable that if the system is locally uniformly observable, there exists a function $\Theta: Z \to X$ such that, for any applied inputs $U_{[k-n,k-1]} \in U$ and outputs $Y_{[k-n,k-1]} \in Y$, the following equation holds $$x_k = \Theta(z_k) \in X, \text{ where} \quad (7)$$

$$z_k = \begin{bmatrix} Y_{[k-n,k-1]} \\ U_{[k-n,k-1]} \end{bmatrix} \text{ and } Z = Y \times U.$$

The relation from the state space X to the extended control and output space Z is thus shown.

Based on the universal theory, the optimal state-feedback controller (3B6) can be represented using basis functions $\phi_i(x_k)$ in state space (3B2):

$$u^*_k(x_k) = \sum_{k=0}^{\infty} \omega_i \phi_i(x_k). \quad (8)$$

Equivalently, the optimal controller can be represented using basis function $\phi_i(z_k)$ in extended control and output space (3B5), which results in an optimal output-feedback controller $$u^*_k(z_k) = \sum_{k=0}^{\infty} \omega_i \phi_i(\Theta(z_k)) := \sum_{k=0}^{\infty} \omega_i \phi'_i(z_k). \quad (9)$$

Some embodiments use a data-driven control to approximate the optimal control policy via Q-learning and output-feedback. Q-learning is a model-free reinforce learning approach to learn the optimal control policy and the Q-function for the optimal control policy. Note that the optimal value function in (4) is equivalent to Q-function for an optimal control policy, i.e., $V^*(x_k)=Q^*(x_k, u^*(x_k))$. In this sense, the Q-learning can be used to determine the optimal value function as well.

The Q-learning can be implemented are state-feedback, leading to the Q-functions with respect to control and state. However, some embodiments modify the Q-learning to select the arguments of Q-function as control and output for the sake of proposing a data-driven output-feedback control algorithm.

Figure 5:
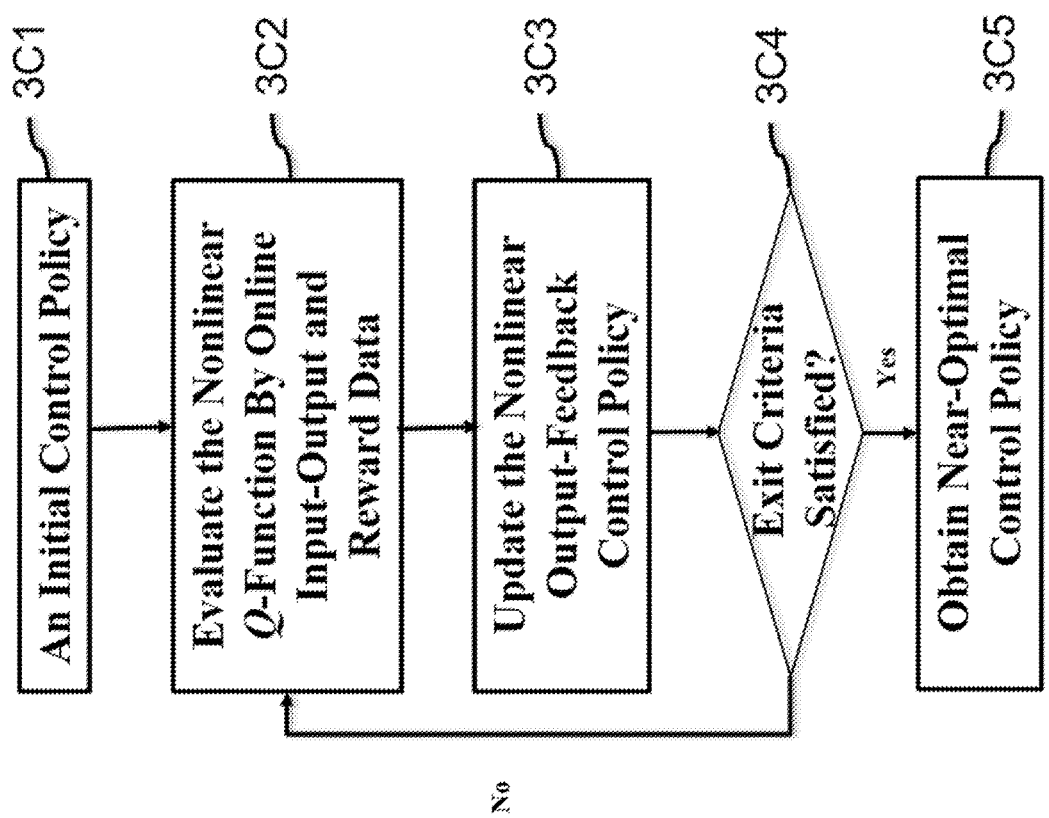
FIG. 5 shows a flow chart of a method for determining control policy according to some embodiments.

FIG. 5 shows a flow chart of a method for determining control policy according to some embodiments. These embodiments determine the control policy by solving data-driven nonlinear adaptive optimal control problems with output-feedback. This method uses a value iterative technique, and summarized by the following steps.

First, the method initialize 3C1 the feedback control policy. For example, the method selects an initial output-feedback control policy $$u_k^0(z_k) = \sum_{i=0}^{N} \omega_i^0{}' \phi_i(z_k)$$

with N a large enough positive number. Notice that this control policy may not be a stabilizing control policy. However, the method can use this initial control policy to generate some online input and state data in finite time.

Next, the method evaluates 3C2 nonlinear Q-function in terms of online control input, output and reward data. As mentioned before, the Q-function here is a function of retrospective control input and output, i.e., Q $(z_k, u_k)$. Note that the Q-function is represented by a bold form in order to differentiate itself from the weight function in the cost (2). The Q-function can be updated iteratively. Particularly, at the j+1th iteration $Q^{j+1}(z_k, u_k) = Q^j(z_k, u_k) + Q(y_{k+1}) + u_{k+1}^T R u_{k+1}$.

In some embodiments, the update 3C2 of Q-function, is in terms of basis function. Essentially, the method updates the weights $c_i^{j+1}$ of the Q-function $$Q^{j+1}(z_k, u_k) = \sum_{i=0}^{N} c_i^{j+1} \psi_i(z_k, u_k).$$

In some implementations, similar to the adaptive control system, the conditions of persistent excitation need to be met in order to update the weights $c_i^{j+1}$ in a reliable manner. To that end, some embodiment can use a perturbation signal to excite the system.

After Q-function is determined, the method updates 3C3 the nonlinear output-feedback control policy. The updated control policy can be found by $u_k^{j+1}(z_k) = \mathrm{argmin}_{u_k} Q^{j+1}(z_k, u_k)$.

Similar to block 3C2, some embodiments approximate the non-linear function of the updated control policy using weighted combination of the basis function, and the update 3C3 finds the weights of the improved control policy.

The method tests the termination conditions 3C4 to terminate the iteration when termination condition is met. For example, the method terminates the iterations, if $$\left\| \sum_{i=0}^{N} (c_i^{j+1} - c_i^j) \right\|^2 \vee < \epsilon,$$

with $\epsilon$ a predefined sufficiently small constant. Otherwise, go to block 3C2 with iteration j replaced by j−1. After the termination condition is met, the method outputs 3C5 optimal and approximation of the optimal control policy.

Figure 6:
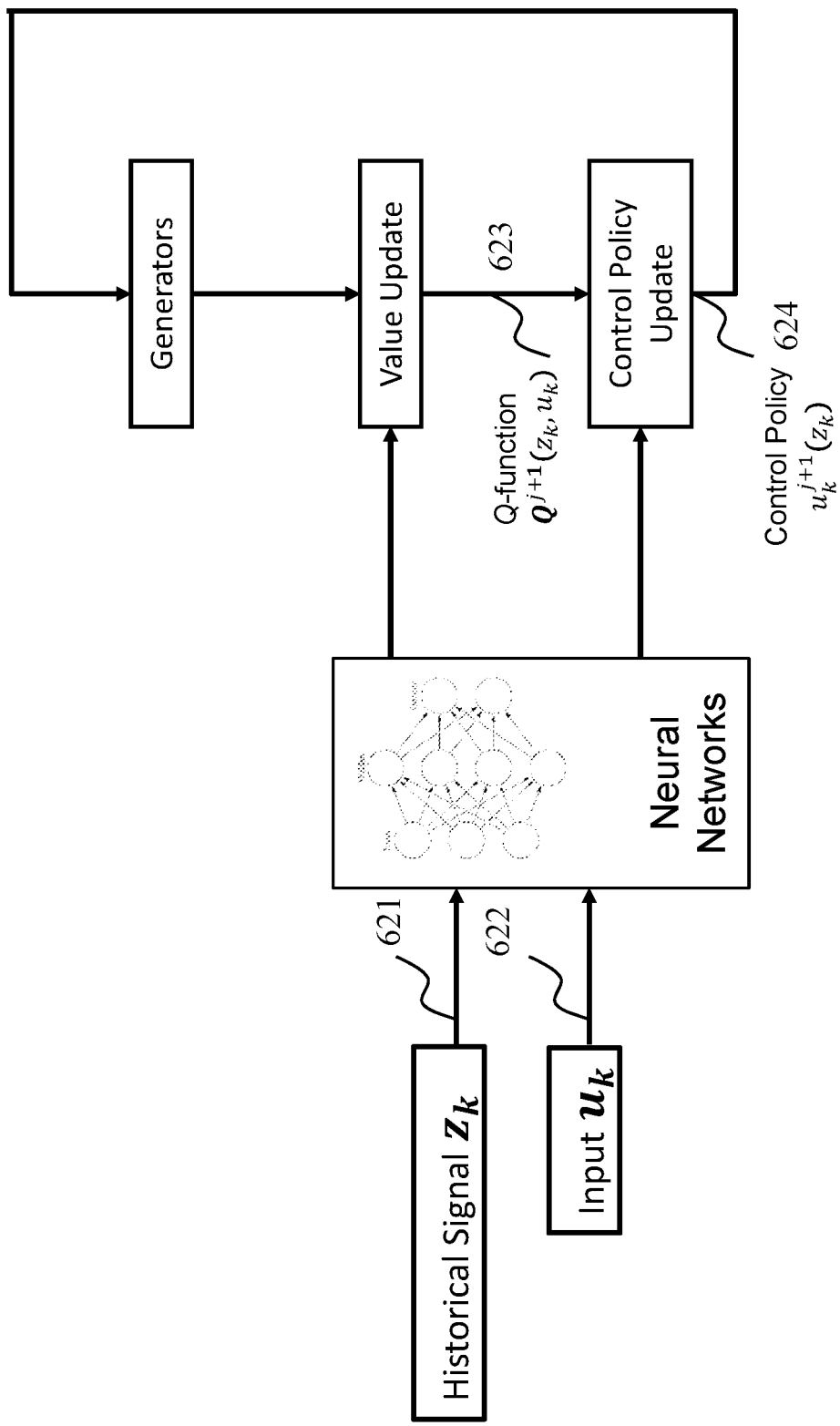
FIG. 6 shows a schematic of reinforcement learning according one embodiment.

FIG. 6 shows a schematic of reinforcement learning according one embodiment. In this embodiment, the reinforcement learning approximates one or combination of constructing the value function and updating the control policy using a neural network. The value function and control policy are successively updated based on the collected historical input/output data $(z_k)$ 621 and current input data $(u_k)$ 622. More specifically, in one embodiment, neural networks are established to train the weights where the input of neural network is $z_k$ and $u_k$, while the output of neural network are value function 623 and/or control policy 624. If the iteration goes to infinity, the learned value function 623 and control policy 624 will converge to the corresponding optimal value function and optimal control policy. For the finite number of iterations, the control policy approximates the optimal control policy.

Figure 7:
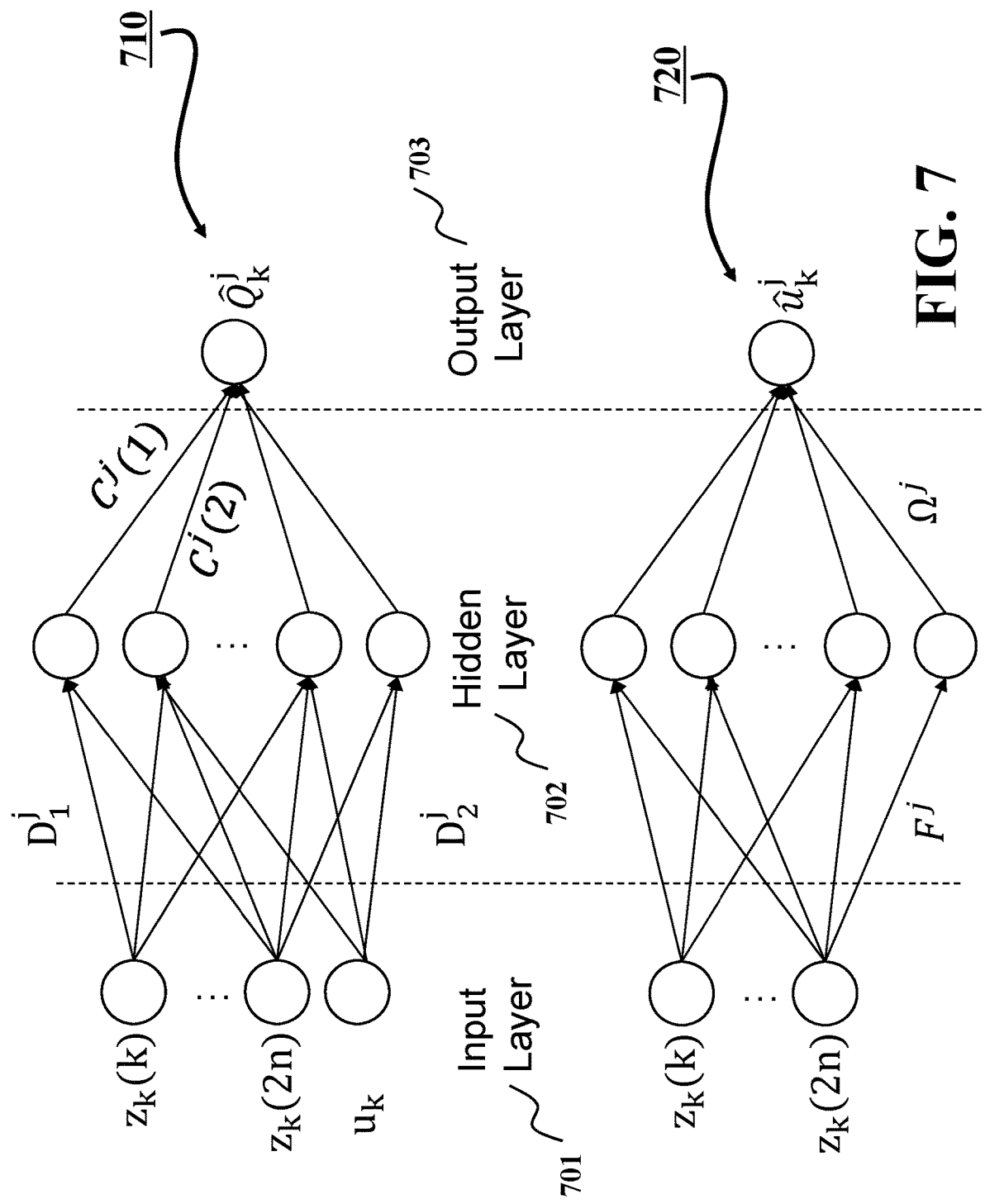
FIG. 7 shows a schematic of a neural network used by some embodiments to implement a data-driven output-feedback control of a power generator.

FIG. 7 shows a schematic of a neural network used by some embodiments to implement a data-driven output-feedback control of a power generator. In some implementations, a critic neural network 710 is used approximate the value function while an actor neural network 720 is used to approximate the solution to the optimal output-feedback control policy. Here, each neural network 710 and 720 includes three layers, i.e., input layer 701, hidden layer 702 and output layer 703.

The critic neural network is $$\hat{Q}_k^j = C^j \hat{\psi}(D_1^j z_k, D_2^j u_k)$$

where $C^j$ are the weights of the hidden layer, and are the weights of input layer to the hidden layer at the jth iteration. The actor neural network is $$\hat{u}_k^j = \Omega^j \hat{\psi}(F^j z_k)$$

where $\Omega$ are the weights of the hidden layer, and $F^j$ are the weights of input layer to the hidden layer at the jth iteration.

One embodiment trains the actor and critic neural networks via minimizing some squared errors $E=0.5 e^T e$. In other words, the weights of hidden layer and input layer are updated through minimizing squared errors and some least-square methods. The convergence of the learning algorithm is ensured as well in this way.

Figure 8:
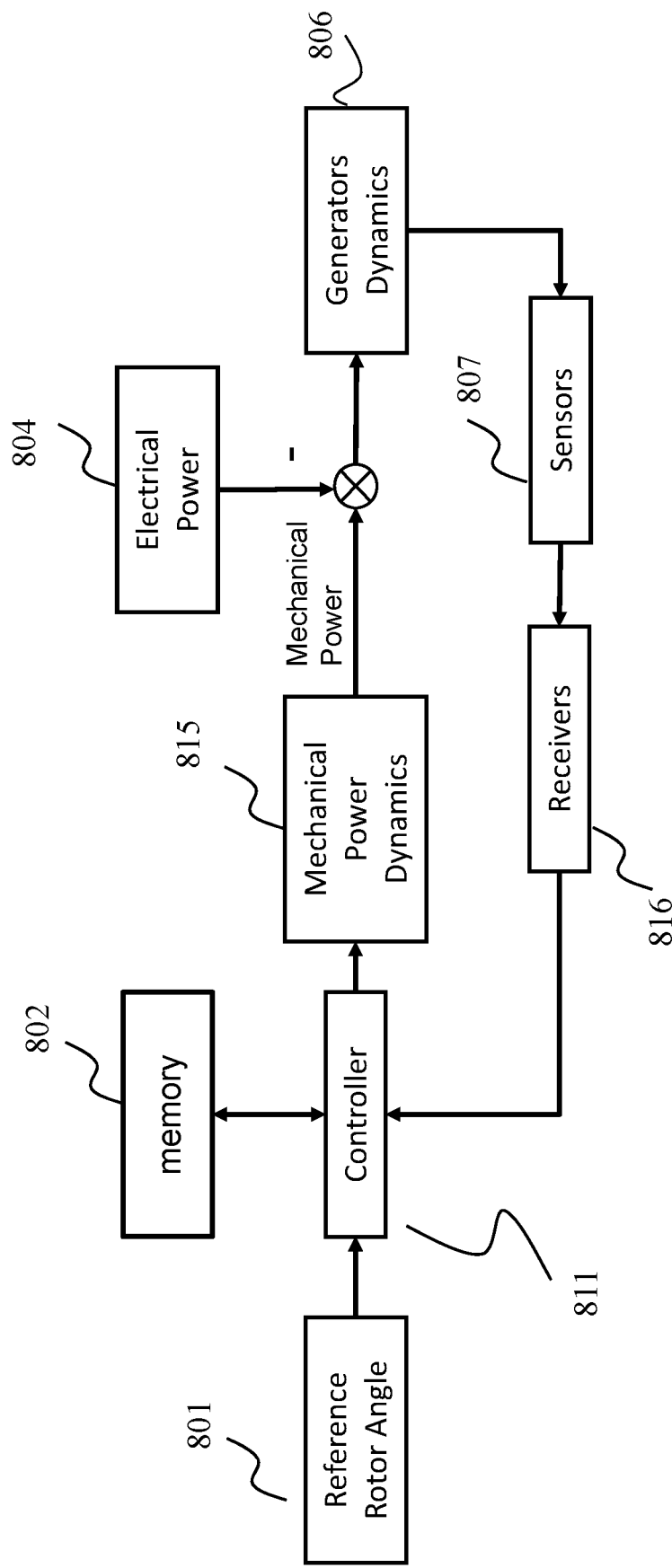
FIG. 8 shows a block diagram of a system and a method for controlling a power generator according to some embodiments.

FIG. 8 shows a block diagram of a system and a method for controlling a power generator according to some embodiments. The reference value 801 of rotor angle are obtained for each of generators 2,3, . . . n of the power system. For example, the reference value 801 of rotor angle can be determined by the rotor angle of generator 1. The controller 811 regulates the mechanical power 815 of generators and corresponding electrical power 804 based on collected current output data from receiver 816 measured by sensors 807 and the historical input and output data from memory 802 using output-feedback control of some embodiments. Here the specific generator dynamics 806 is uncertain and some parameters in generator model are unknown, which is the problem addressed by the data-driven and/or model-free control strategy of some embodiments.

Figure 9:
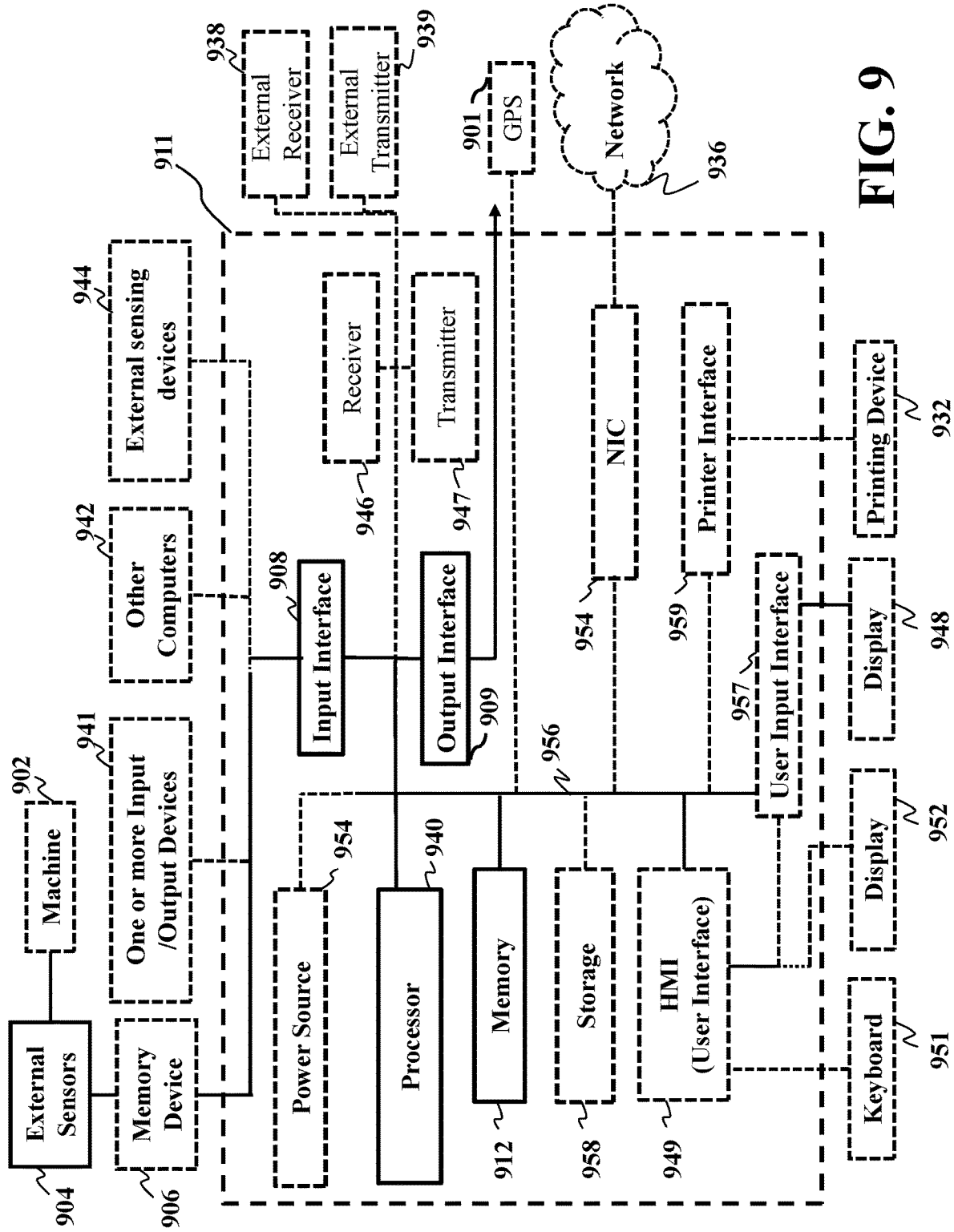
FIG. 9 shows a block diagram of illustrating of exemplar implementation of a control system of FIG. 1A according to some embodiments.

FIG. 9 shows a block diagram of illustrating of exemplar implementation of a control system of FIG. 1A according to some embodiments. The control system 911 includes a processor 940, computer readable memory 912, storage 958 and user interface 949 with display 952 and keyboard 951, which are connected through bus 956. For example, the user interface 949 in communication with the processor 940 and the computer readable memory 912, acquires and stores the data in the computer readable memory 912 upon receiving an input from a surface, keyboard surface, of the user interface 957 by a user.

Contemplated is that the memory 912 can store instructions that are executable by the processor, historical data, and any data to that can be utilized by the methods and systems of the present disclosure. The processor 940 can be a single core processor, a multi-core processor, a computing cluster, or any number of other configurations. The processor 940 can be connected through a bus 956 to one or more input and output devices. The memory 912 can include random access memory (RAM), read only memory (ROM), flash memory, or any other suitable memory systems.

Still referring to FIG. 9, a storage device 958 can be adapted to store supplementary data and/or software modules used by the processor. For example, the storage device 958 can store historical data and other related data as mentioned above regarding the present disclosure. Additionally, or alternatively, the storage device 958 can store historical data similar to data as mentioned above regarding the present disclosure. The storage device 958 can include a hard drive, an optical drive, a thumb-drive, an array of drives, or any combinations thereof.

The system can be linked through the bus 956 optionally to a display interface (not shown) adapted to connect the system to a display device (not shown), wherein the display device can include a computer monitor, camera, television, projector, or mobile device, among others.

The controller 911 can include a power source 954, depending upon the application the power source 954 may be optionally located outside of the controller 911. Linked through bus 956 can be a user input interface 957 adapted to connect to a display device 948, wherein the display device 948 can include a computer monitor, camera, television, projector, or mobile device, among others. A printer interface 959 can also be connected through bus 956 and adapted to connect to a printing device 932, wherein the printing device 932 can include a liquid inkjet printer, solid ink printer, large-scale commercial printer, thermal printer, UV printer, or dye-sublimation printer, among others. A network interface controller (NIC) 954 is adapted to connect through the bus 956 to a network 936, wherein data or other data, among other things, can be rendered on a third party display device, third party imaging device, and/or third party printing device outside of the controller 911. Further, the bus 956 can be connected to a Global Positioning System (GPS) device 901 or a similar related type device.

Still referring to FIG. 9, the data or other data, among other things, can be transmitted over a communication channel of the network 936, and/or stored within the storage system 958 for storage and/or further processing. Further, the data or other data may be received wirelessly or hard wired from a receiver 946 (or external receiver 938) or transmitted via a transmitter 947 (or external transmitter 939) wirelessly or hard wired, the receiver 946 and transmitter 947 are both connected through the bus 956. The controller 911 may be connected via an input interface 908 to external sensing devices 944 and external input/output devices 941. The controller 911 may be connected to other external computers 942, memory device 906 and external sensors 904 sensing the operation of a machine 902. An output interface 909 may be used to output the processed data from the processor 940.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A control system for controlling an operation of a power generator of a power generation system, comprising:
   a receiver configured to accept a measurement of a current value of an angle of a rotor of the power generator;
   a memory configured to store
      an input-and-output sequence of values of the operation of the power generator including a sequence of multiple values of the rotor angle of the power generator and a corresponding sequence of multiple values of excitation voltage to the power generator causing the values of the rotor angle; and
      a control policy mapping the input-and-output sequence to a current control input defining a current value of the excitation voltage;
   a transmitter configured to submit the current value of the excitation voltage for an actuator of the power generator; and
   a processor configured to iteratively control the power generator using the control policy, wherein for an iteration, the processor is configured to
      execute the control policy to map the input-and-output sequence to the current value of the excitation voltage;
      submit through the output interface the current value of the excitation voltage to the power generator;
      accept through the input interface the current value of the rotor angle caused by actuating the power generator according to the current value of the excitation voltage; and
      update the input-and-output sequence with the corresponding current values of the rotor angle and the excitation voltage,
   wherein the power generation system includes multiple generators, wherein the control policy is trained to drive asymptotically a relative angle between generators to a zero value.

2. The control system of claim 1, wherein the input-and-output sequence includes a fixed number of pairs of values of the rotor angle and the excitation voltage.

3. The control system of claim 2, wherein the input-and-output sequence includes four values of the rotor angle and four values of the excitation voltage.

4. The control system of claim 2, wherein the processor, to update the input-and-output sequence, is configured to append the current values of the rotor angle and the excitation voltage to the end of the input-and-output sequence and remove the oldest pair of values of the rotor angle and the excitation voltage from the input-and-output sequence.

5. The control system of claim 1, wherein the control policy is trained to control the rotor angle according to a reference trajectory.

6. The control system of claim 5, wherein the reference trajectory is a constant reference rotor angle.

7. The control system of claim 1, further comprising:
   a reinforcement learner configured to be executed by the processor to update the control policy recursively during the operation of the power generator using a reinforcement learning based on a training input-and-output sequence having a length greater than the length of the input-and-output sequence.

8. The control system of claim 7, wherein the control policy maps the input-and-output sequence to the current value of the excitation voltage using a nonlinear function learned with the reinforcement learning, wherein the nonlinear function is a composite function of a nonlinear mapping between the current value of the excitation voltage and a state of the power generator and a function of nonlinear mapping between the state the power generator and the input-and-output sequence.

9. The control system of claim 7, wherein the reinforcement learning constructs a value function as a function of the input-and-output sequence and updates the control policy based on the value function.

10. The control system of claim 9, wherein the reinforcement learning approximates one or combination of constructing the value function and updating the control policy using a neural network.

11. The control system of claim 8, wherein the nonlinear function is an approximation of an optimal nonlinear function ensuring an optimal control policy and stability of the power generator.

12. The control system of claim 1, wherein the input-and-output sequence is formed only with pairs of values of the rotor angel and the excitation voltage.

13. A control method for controlling an operation of a power generator of a power generation system, wherein the method uses a processor coupled with stored instructions implementing the method, wherein the instructions, when executed by the processor carry out steps of the method, comprising:

executing a control policy to map an input-and-output sequence to a current value of the excitation voltage, wherein the input-and-output sequence of values of the operation of the power generator includes a sequence of multiple values of the rotor angle of the power generator and a corresponding sequence of multiple values of excitation voltage to the power generator causing the values of the rotor angle, and wherein the control policy maps the input-and-output sequence to a current control input defining the current value of the excitation voltage;

submitting the current value of the excitation voltage to the power generator;

accepting a current value of the rotor angle caused by actuating the power generator according to the current value of the excitation voltage; and updating the input-and-output sequence with the corresponding current values of the rotor angle and the excitation voltage, wherein the power generation system includes multiple generators, wherein the control policy is trained to drive asymptotically a relative angle between generators to a zero value.

14. A non-transitory computer readable storage medium embodied thereon a program executable by a processor for performing a method, the method comprising:

executing a control policy to map an input-and-output sequence to a current value of the excitation voltage, wherein the input-and-output sequence of values of the operation of the power generator includes a sequence of multiple values of the rotor angle of the power generator and a corresponding sequence of multiple values of excitation voltage to the power generator causing the values of the rotor angle, and wherein the control policy maps the input-and-output sequence to a current control input defining the current value of the excitation voltage;

submitting the current value of the excitation voltage to the power generator;

accepting a current value of the rotor angle caused by actuating the power generator according to the current value of the excitation voltage; and updating the input-and-output sequence with the corresponding current values of the rotor angle and the excitation voltage, wherein the power generation system includes multiple generators, wherein the control policy is trained to drive asymptotically a relative angle between generators to a zero value.

* * * * *